(12) United States Patent
Pan et al.

(10) Patent No.: US 7,884,021 B2
(45) Date of Patent: Feb. 8, 2011

(54) PLANARIZATION OF A LAYER OVER A CAVITY

(75) Inventors: Shaoher X. Pan, San Jose, CA (US); Chii Guang Lee, Fremont, CA (US)

(73) Assignee: Spartial Photonics, Inc., Sunnyvale, CA (US)

( * ) Notice: Subject to any disclaimer, the term of this patent is extended or adjusted under 35 U.S.C. 154(b) by 996 days.

(21) Appl. No.: 11/679,767

(22) Filed: Feb. 27, 2007

(65) Prior Publication Data
US 2008/0203054 A1 Aug. 28, 2008

(51) Int. Cl.
*H01L 21/4757* (2006.01)
(52) U.S. Cl. ............... 438/697; 359/291; 359/297; 359/871; 359/872; 216/24; 216/38
(58) Field of Classification Search ............ 438/700, 438/701, 690–694, 697, 699, 702; 359/291, 359/297, 871, 872; 216/24, 38; 257/E21.176
See application file for complete search history.

(56) References Cited

U.S. PATENT DOCUMENTS

| | | | |
|---|---|---|---|
| 5,354,715 A | | 10/1994 | Wang et al. |
| 5,535,047 A * | | 7/1996 | Hornbeck ............... 359/295 |
| 6,356,378 B1 | | 3/2002 | Huibers |
| 6,635,509 B1 * | | 10/2003 | Ouellet ................ 438/106 |
| 6,858,459 B2 * | | 2/2005 | Singh et al. ............. 438/52 |
| 6,887,391 B1 * | | 5/2005 | Daneman et al. ........... 216/2 |
| 6,902,656 B2 * | | 6/2005 | Ouellet et al. ........ 204/192.16 |
| 7,015,885 B2 * | 3/2006 | Novotny et al. .......... 345/84 |
| 7,042,619 B1 * | 5/2006 | McGinley et al. ........ 359/290 |
| 7,071,109 B2 * | 7/2006 | Novotny et al. .......... 438/692 |
| 7,075,701 B2 * | 7/2006 | Novotny et al. .......... 359/291 |
| 7,092,140 B2 * | 8/2006 | Pan et al. ............. 359/290 |
| 7,265,892 B2 * | 9/2007 | Huibers ................ 359/291 |
| 7,294,279 B2 * | 11/2007 | Chen et al. ................ 216/2 |
| 7,307,777 B2 * | 12/2007 | Pan .................... 359/295 |
| 7,369,297 B2 * | 5/2008 | McGinley et al. ........ 359/291 |
| 7,388,708 B2 * | 6/2008 | Pan .................... 359/291 |
| 7,416,908 B2 * | 8/2008 | Lee et al. ............... 438/30 |
| 2004/0184132 A1 * | 9/2004 | Novotny et al. .......... 359/290 |
| 2007/0091413 A1 * | 4/2007 | Yang ................... 359/291 |
| 2007/0273954 A1 * | 11/2007 | Mangrum ............... 359/291 |
| 2008/0123206 A1 * | 5/2008 | Pan .................... 359/871 |
| 2008/0203054 A1 * | 8/2008 | Pan et al. ................ 216/24 |
| 2008/0278068 A1 * | 11/2008 | Huang et al. ............ 313/504 |

OTHER PUBLICATIONS

Pan et al., "Non-Contact Micro Mirrors Having Soft Hinges", U.S. Appl. No. 11/610,464, filed Dec. 13, 2006, 32 pp.

* cited by examiner

*Primary Examiner*—Mary Wilczewski
(74) *Attorney, Agent, or Firm*—Fish & Richardson P.C.

(57) ABSTRACT

A method for fabricating a micro structure includes disposing a sacrificial material in a recess formed in a lower layer and forming a layer of compensatory material on the sacrificial material in the recess. The compensatory material is higher than the upper surface of the lower layer. A first portion of the compensatory material is removed to form a substantially flat surface on the sacrificial material. The substantially flat surface is substantially co-planar with the upper surface of the lower layer. An upper layer is formed on the lower layer and the substantially flat surface.

21 Claims, 34 Drawing Sheets

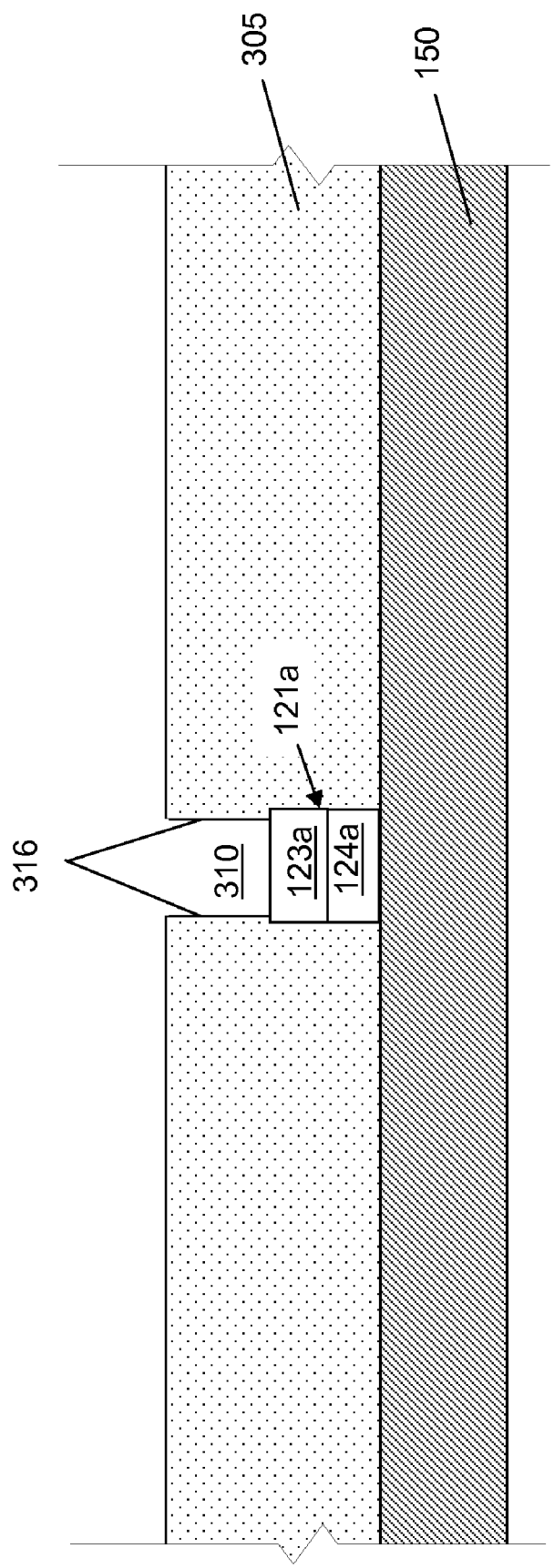

though shown and described with reference to ... (skipping)

PLANARIZATION OF A LAYER OVER A CAVITY

BACKGROUND

The present disclosure relates to the fabrication of micro devices, specifically, a micro device having a mirror surface.

A spatial light modulator (SLM) can be built with an array of tiltable mirror plates having reflective surfaces. Each mirror plate can be tilted about an axis by electrostatic forces to an "on" position and an "off" position. The electrostatic forces can be generated by electric potential differences between the mirror plate and an electrode underneath the mirror plate. In the "on" position, the micro mirror plate can reflect incident light to form an assigned pixel in a display image. In the "off" position, the micro mirror plate can direct incident light away from the display image. A mirror plate can be held by a mechanical stop at the "on" or the "off" position.

SUMMARY

In one general aspect, a method for fabricating a micro structure is described. The method includes disposing a sacrificial material in a recess formed in a lower layer and forming a layer of compensatory material on the sacrificial material in the recess. The compensatory material is higher than the upper surface of the lower layer. A first portion of the compensatory material is removed using isotropic etching to form a substantially flat surface on the sacrificial material. The substantially flat surface is substantially co-planar with the upper surface of the lower layer. An upper layer is formed on the lower layer and the substantially flat surface.

In another general aspect, a method for fabricating a micro structure is described. The method includes disposing a sacrificial material in a recess formed in a lower layer; forming a photo-resist layer on the sacrificial material in the recess and the lower layer; removing a first portion of the photo-resist layer on the lower layer and the sacrificial material to form a substantially flat surface on the sacrificial material, wherein the substantially flat surface is substantially co-planar with the upper surface of the lower layer; and forming an upper layer on the lower layer and the substantially flat surface.

In another general aspect, a method for fabricating a mirror plate over a substrate is described. The method includes forming a hinge support post on the substrate, forming a hinge connection post on the hinge support post and a hinge layer connected to the hinge connection post simultaneously and forming a spacer layer on the hinge layer. The spacer layer comprises a hole over the hinge connection post. A first sacrificial material is disposed in the hole in the spacer layer. A layer of compensatory material is formed on the first sacrificial material. The compensatory material is higher than the upper surface of the spacer layer. A first portion of the compensatory material is removed using isotropic etching to form a substantially flat surface on the sacrificial material. The substantially flat surface is substantially co-planar with the upper surface of the spacer layer. A reflective layer is formed over the hinge layer and the substantially flat surface. Portions of the reflective layer and the hinge layer are selectively removed to form the mirror plate and a hinge component that is connected to the hinge connection post and the hinge layer. The mirror plate is configured to tilt around the hinge component.

In another general aspect, a method for fabricating a mirror plate over a substrate is described. The method includes forming a hinge support post on the substrate. A hinge connection post is formed on the hinge support post and a hinge layer connected to the hinge connection post. A spacer layer is formed on the hinge layer. The spacer layer comprises a hole over the hinge connection post. A first sacrificial material is disposed in the hole in the spacer layer. A photo-resist layer is formed on the first sacrificial material and the spacer layer. A first portion of the photo-resist layer on the spacer layer and the sacrificial material is removed to form a substantially flat surface on the sacrificial material. The substantially flat surface has substantially the same height as the upper surface of the spacer layer. A reflective layer is formed over the hinge layer and the substantially flat surface. Portions of the reflective layer and the hinge layer are selectively removed to form the mirror plate and a hinge component that is connected to the hinge connection post and the hinge layer. The mirror plate is configured to tilt around the hinge component.

Implementations of the system may include one or more of the following. A method described herein can further include removing the sacrificial material and a second portion of the compensatory material on the sacrificial material to form a cavity under the upper layer. The method can further include forming a middle layer on the lower layer and the sacrificial material in the recess and selectively removing material from the middle layer to form the layer of the compensatory material above the sacrificial material. The middle layer and the sacrificial material can have substantially the same material composition. The step of disposing the sacrificial material and the step of forming the middle layer can be conducted in a continuous step.

The upper layer of a mirror plate can comprise a reflective surface. The isotropic etching can include plasma etching. The compensatory material can include photo resist, silicon, or silicon dioxide. The compensatory material can have substantially the same composition as the sacrificial material. The upper layer can have an upper surface that has a height variation smaller than 0.1 microns. The upper layer can have an upper surface that has height variation smaller than 0.05 microns.

Implementations may include one or more of the following advantages. The disclosed methods can be used to form a flat layer over a cavity. The flat layer can be produced using less material and in shorter time compared to the conventional techniques. When flat mirror surfaces are formed, unwanted light scattering can be reduced. In an SLM, reducing light scattering can increase contrast and brightness. The disclosed system and methods are applicable to micro devices such as micro mirrors and structures with cantilevers.

Although the invention has been particularly shown and described with reference to multiple embodiments, it will be understood by persons skilled in the relevant art that various changes in form and details can be made therein without departing from the spirit and scope of the invention.

BRIEF DESCRIPTION OF THE DRAWINGS

The following drawings, which are incorporated in and form a part of the specification, illustrate embodiments of the present invention and, together with the description, serve to explain the principles of the invention.

DETAILED DESCRIPTION

Figure 1:
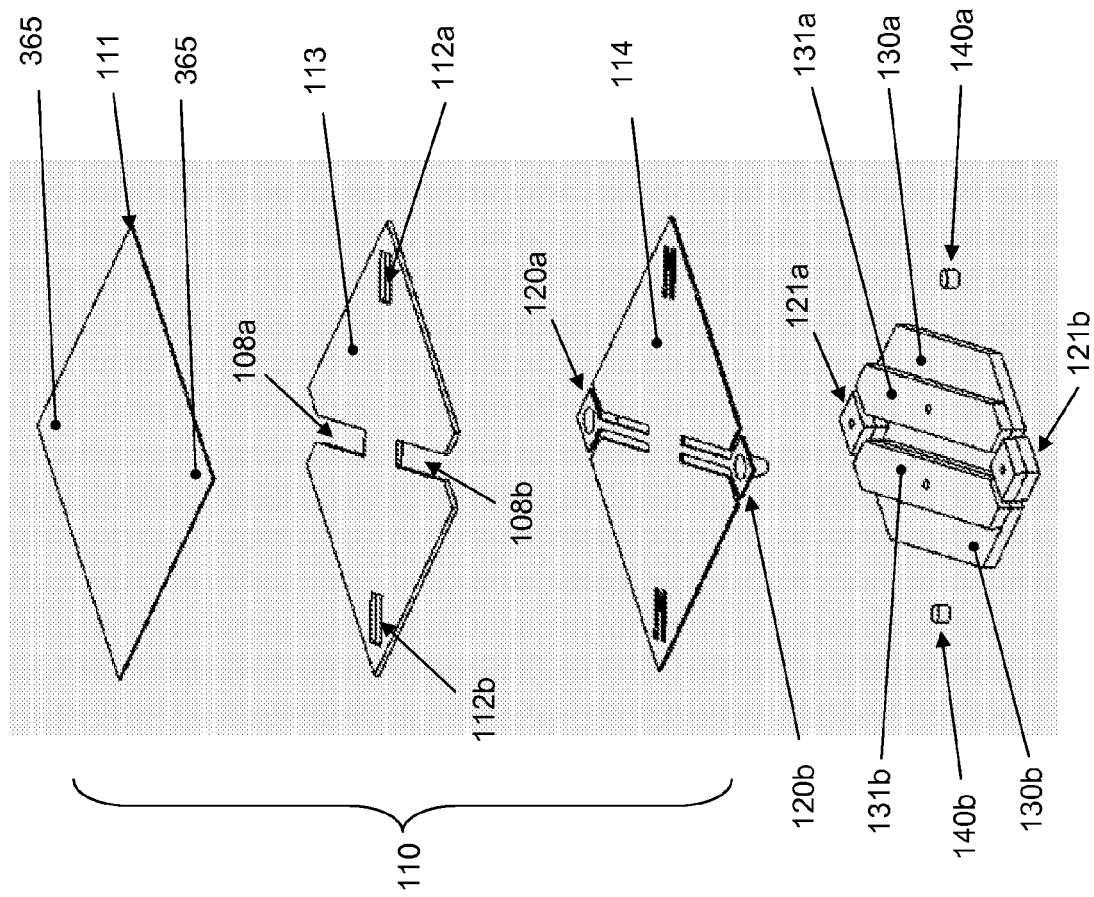
FIG. 1 illustrates an expanded view of a micro mirror.
Figure 2:
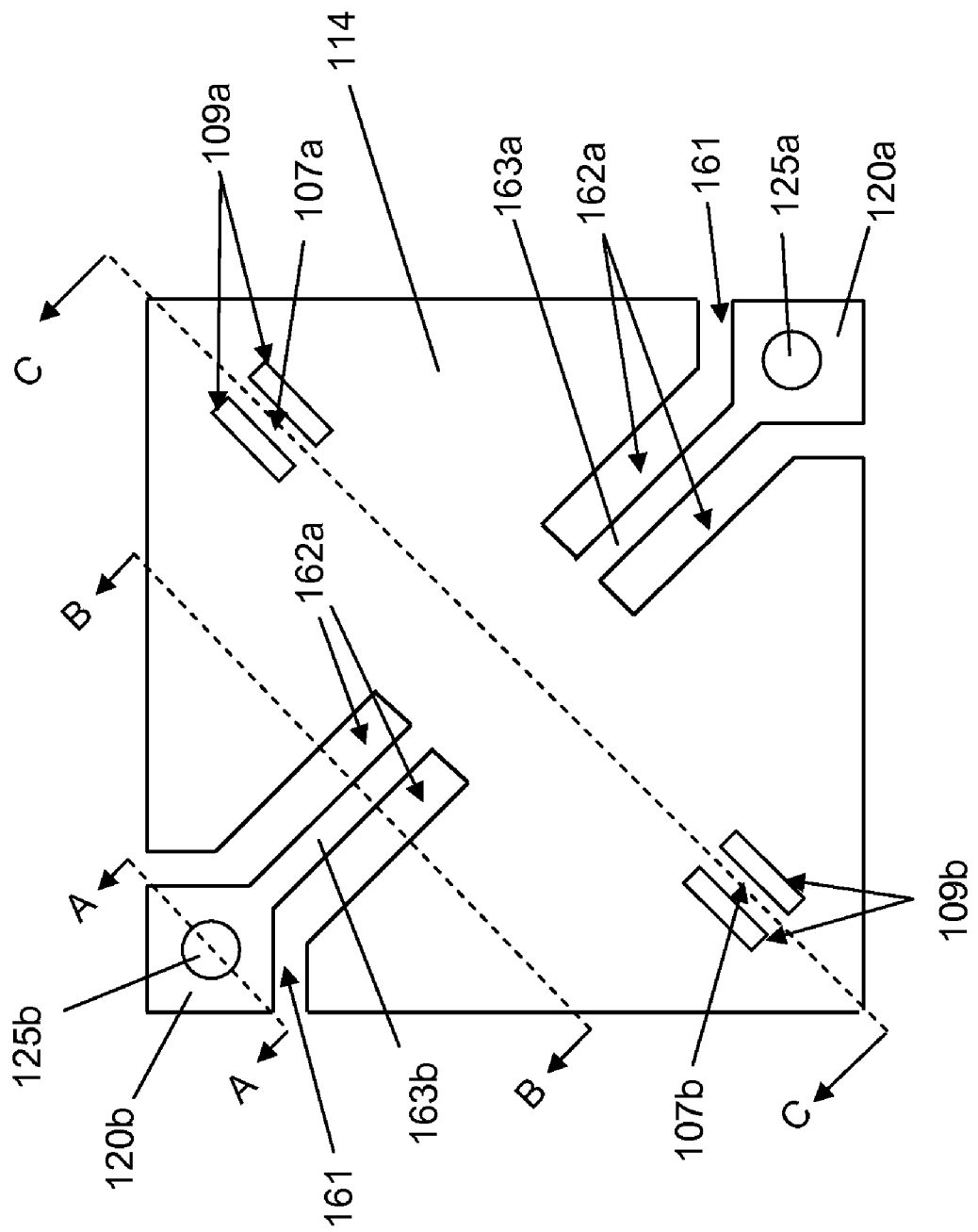
FIG. 2 is a bottom view of the mirror plate of the micro mirror of FIG. 1.
Figure 3:
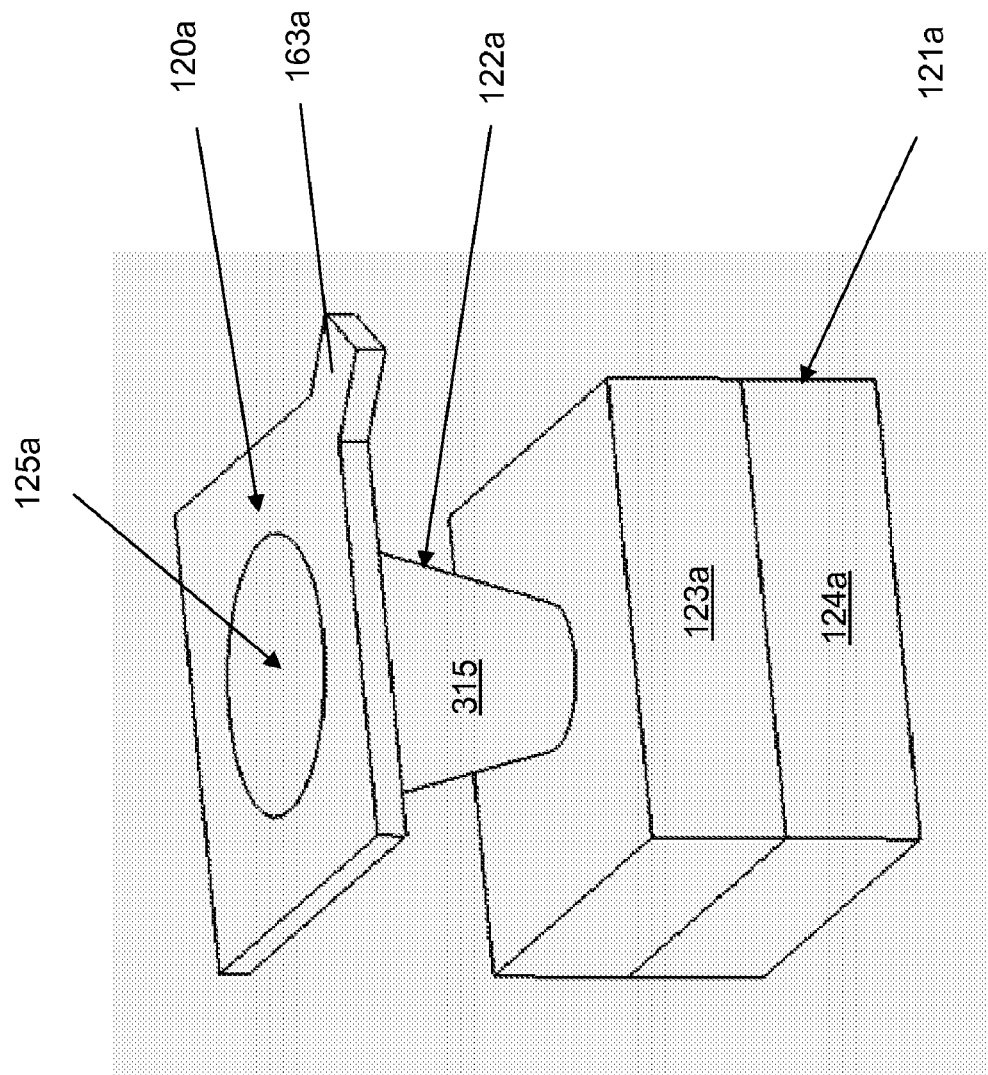
FIG. 3 illustrates a detailed view of a hinge, a hinge connection post and a hinge support post in the micro mirror of FIG. 1.

Referring to FIGS. 1-3, a mirror plate 110 can include a reflective layer 111, a spacer layer 113 and a hinge layer 114. In some embodiments, the spacer layer 113 includes a pair of holes 112a and 112b and a pair of openings 108a and 108b. In some embodiments the hinge layer 114 includes two hinge components 120a and 120b. Each hinge component 120a or 120b includes a cavity 125a or 125b in the center. The hinge components 120a and 120b are respectively connected with the main portion of the hinge layer 114 by elongated hinges 163a and 163b. The elongated hinges 163a and 163b are separated from the main portion of the hinge layer 114 by gaps 162a, 162b. The hinge components 120a and 120b are separated from the main portion of the hinge layer 114 by gaps 161. The mirror plate 110 can be tilted about an axis defined by the two hinge components 120a and 120b. In some embodiments, the hinge layer 114 also include two pairs of holes 109a and 109b, respectively, under the holes 112a and 112b in the spacer layer. Each pair of holes 109a or 109b define a bridge 107a or 107b in the hinge layer 114. The bridge 107a or 107b is located under the hole 112a or 112b in the spacer layer 113. As shown in FIGS. 19A and 21, each bridge 107a or 107b is positioned above a landing stop 140a and 140b on the substrate. Lines A-A, B-B and C-C in FIG. 2 indicate the cross sections for the cross-sectional views in FIG. 5-20.

Figure 22:
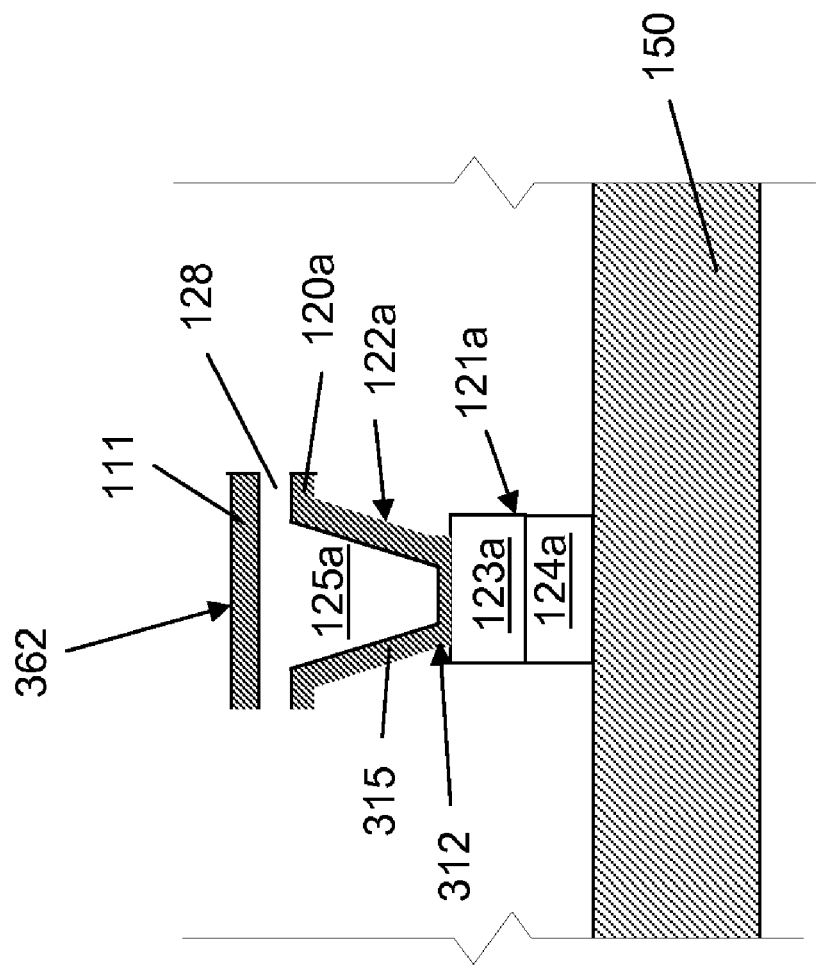

Referring to FIG. 3, the hinge component 120a (or 120b) is connected to a hinge connection post 122a under the hinge component 120a. As also shown in FIG. 22, the hinge connection post 122a includes a bottom layer 312 and a side layer 315, which define a cavity 125a in the center of the hinge connection post 122a. The cavity 125a or 125b can have a circular opening as shown in the FIG. 1-3 or a rectangular opening, such as a square opening. In some embodiments, the side layer 315 can be substantially vertical to the substrate. In embodiments, the side layer 315 has slanted walls. The side layer 315 can form a cup-like structure in conjunction with the bottom layer 312. In cavities that have a circular opening, the side layer 315 can be conical or have parallel walls. In cavities that have a rectangular opening, the side layer 315 can have a tapered wall or vertical parallel walls that are parallel to one another. In embodiments, the hinge connection post has the same shape or cross section as the opening in the hinge component.

The bottom of the hinge connection post 122a is connected to a hinge support post 121a on a substrate The side layer 315 and the bottom layer 312 can be made of substantially the same material and form a unitary structure. The side layer 315 and the hinge layer 114 can have substantially the same thickness. The side layer 315 and the hinge layer 114 in the hinge support post 121a can be of a conical or a frustoconical shape. In some embodiments, the side layer 315 is thinner than the bottom layer 312. The hinge component 120a, 120b and the hinge layer can be formed by a same planar layer (the hinge layer 114). The hinge support post 121a can include an upper portion 123a and a lower portion 124b that can be formed in separate deposition steps.

For spatial light modulators, the reflective layer 111 is ideally "optically flat", that is, the height variation in the upper reflective surface of the reflective layer 111 is much smaller than the wavelength of the light used in the spatial modulation. For example, the height variation in the upper reflective surface of the reflective layer 111 can be below 0.1 microns, 0.05 microns, or 0.02 microns. Specifically, it is desirable for the portions of the reflective layer 111 over the cavities 125a and 125b to be flat. The flat surfaces 365 in these portions should be as "optically flat" as the rest of the reflective surfaces on the reflective layer 111. Fabricating a flat reflective layer 111 over cavities 125a and 125b can be challenging because a layer overhanging a cavity tends sag in some fabrication processes. Fabrication processes for building flat reflective layer 111 over the cavities 125a and 125b are described below in conjunction with FIGS. 18A-19B.

Figure 4:
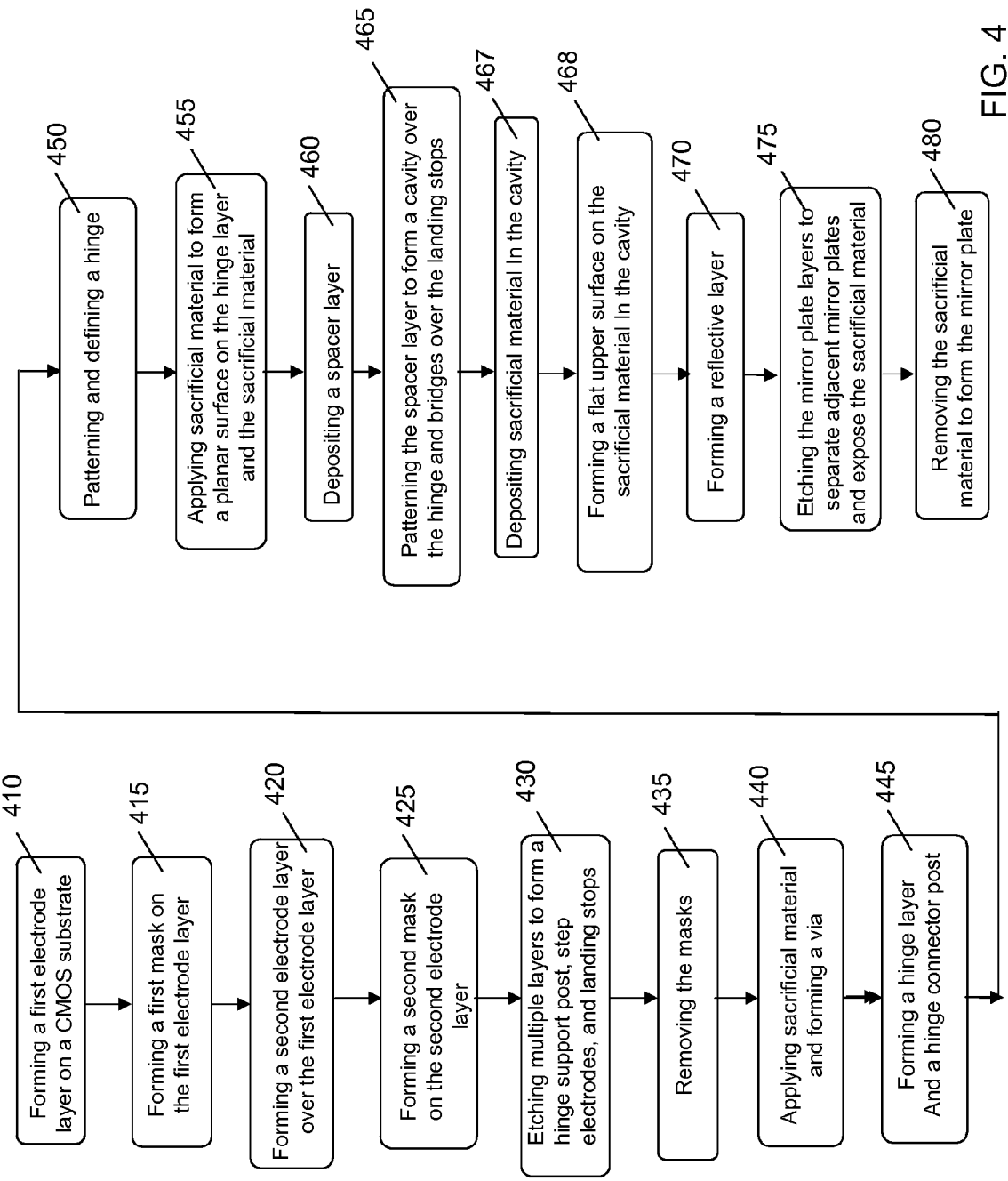
FIG. 4 illustrates a process flow diagram for fabricating the micro-mirror.
Figure 5:
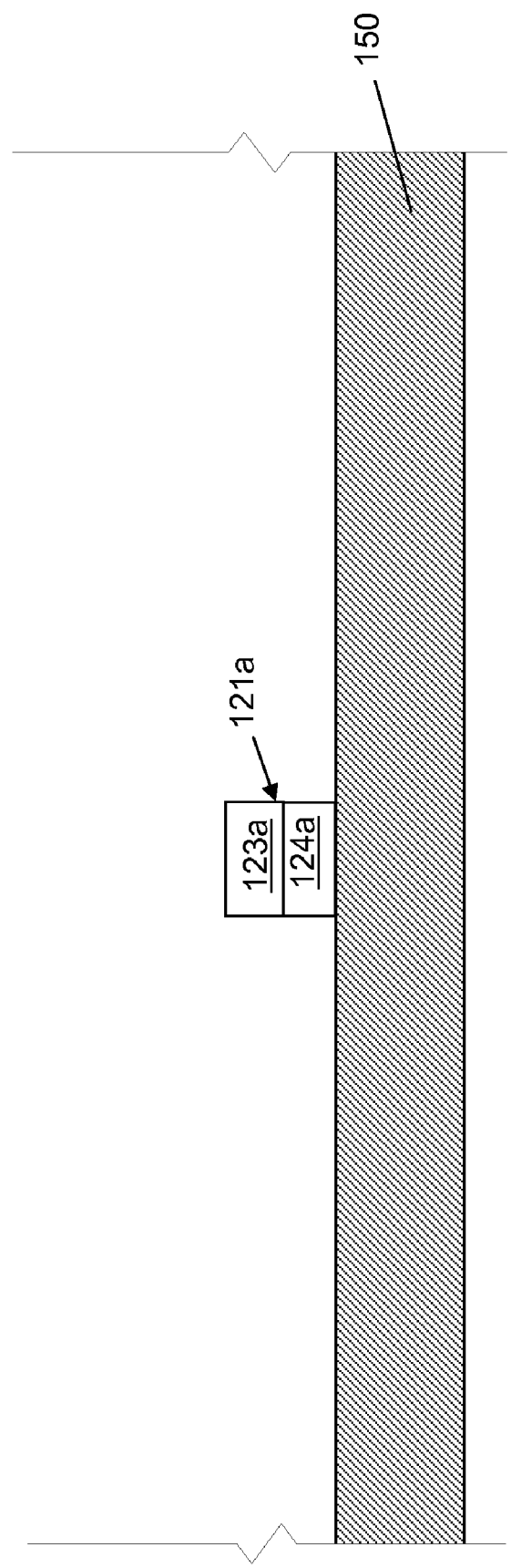
FIGS. 5-8 are cross-sectional views along line A-A of FIG. 2 showing several steps of fabricating the micro mirror on a substrate.

Turning now to the fabrication of the spatial light modulator, referring to FIGS. 1, 4 and 5, the hinge support posts 121a, 121b, step electrodes 130a, 130b, 131a and 131b and landing stops 140a, 140b are formed on a substrate 150 (steps 410-435). The substrate 150 can include electric circuits connecting to the hinge support posts 121a, 121b, step electrodes 130a, 130b, 131a and 131b and landing stops 140a, 140b. The hinge layer 114 and the hinge connection posts 122a, 122b and the support posts 121a, 121b are formed of an electrically conducting material. Thus, the hinge layer 114 is electrically connected with the hinge support posts 121a, 121b through the hinge connection posts 122a, 122b. The electric potentials of the hinge layer 114 and the step electrodes 130a, 130b, 131a and 131b can be controlled to produce electric potential difference between the hinge layer 114 and the step electrodes 130a, 131a or the step electrodes 130b, 131b. The resulting electrostatic forces can tilt the mirror plate 110 about an axis defined by the two hinge components 120a and 120b. Details of the steps 410-435 are disclosed in U.S. patent application Ser. No. 11/382,630, entitled "Method for Fabricating a Micro Structure", filed May 10, 2006, which is incorporated by reference herein for all purposes.

Figure 6:
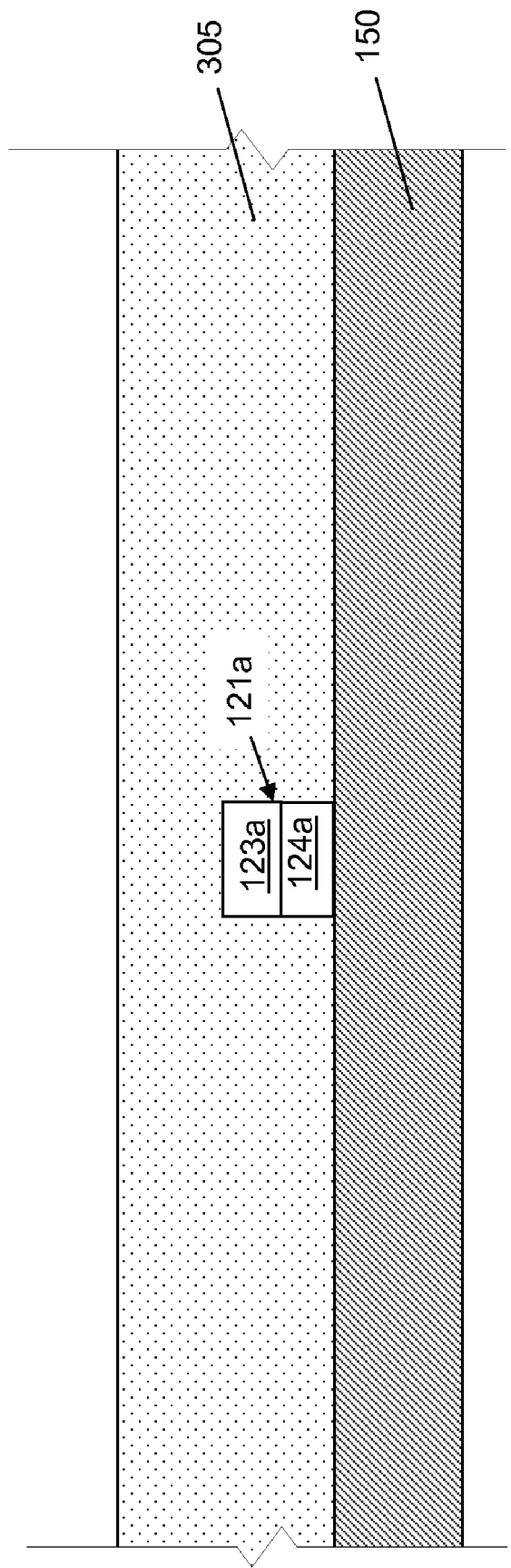

Referring to FIG. 6, a sacrificial material 305 is disposed, for example, by spin-coating, over the substrate 150, the hinge support posts, 121a, 121b the step electrodes 130a, 130b, 131a and 131b and landing stops 140a, 140b (step 440). The sacrificial material can include a photo resist material, amorphous carbon, polyarylene, polyarylene ether (which can be referred to as SILK) and hydrogen silsesquioxane (HSQ). After hardening, if required, the sacrificial material 305 can be planarized by chemical mechanical polishing (CMP) to a predetermined height that defines the distance between the lower surface of the hinge layer 114 in the mirror plate 110 and the substrate 150 (see FIGS. 8-22). A via 310 is formed in the sacrificial material 305 over the hinge support posts 121a to expose the upper surface of the hinge support posts 121a (shown in FIG. 7A). The via 310 can have a circular or a rectangular opening.

Figure 7B:
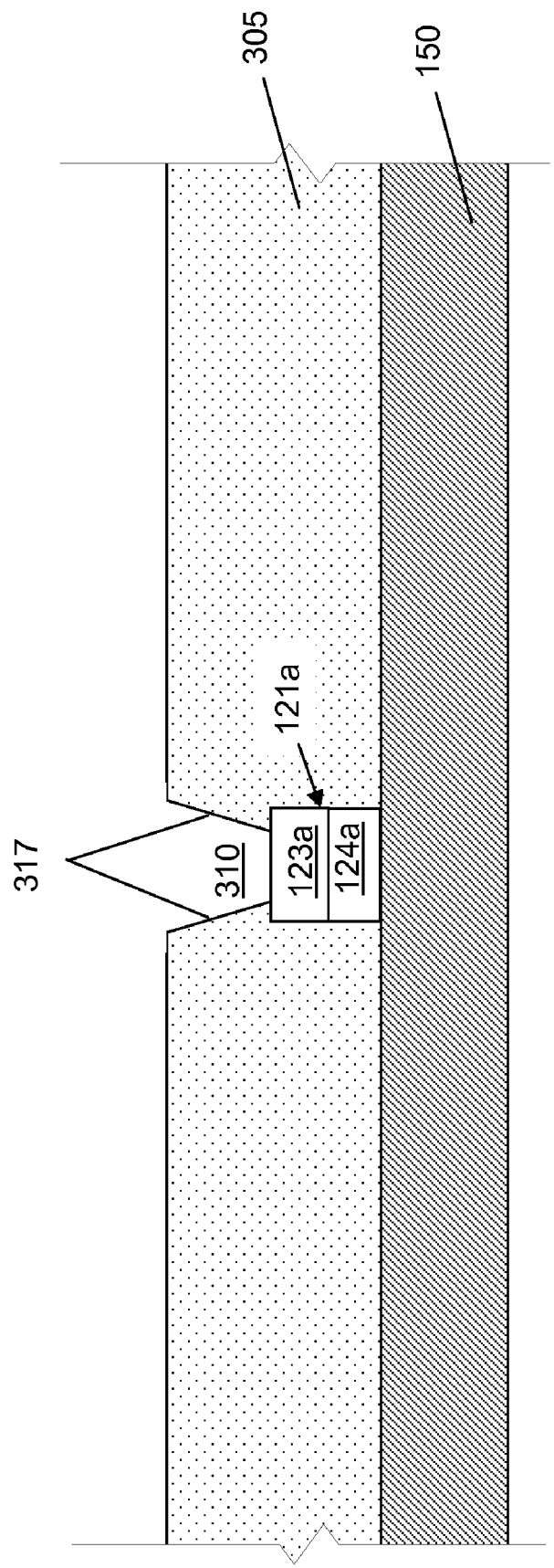

The via 310 initially includes side walls 316 substantially perpendicular to the substrate 150. The substrate 150 having the hinge support posts 121a, 121b and the sacrificial material 305 are then subject to a high temperature treatment to cause the photo resist to over flow to form side walls 317 that are sloped with respect to the substrate 150, as shown in FIG. 7B. In some embodiments, sloped side walls 317 can be formed in the via 310 by anisotropic etching.

Figure 8:
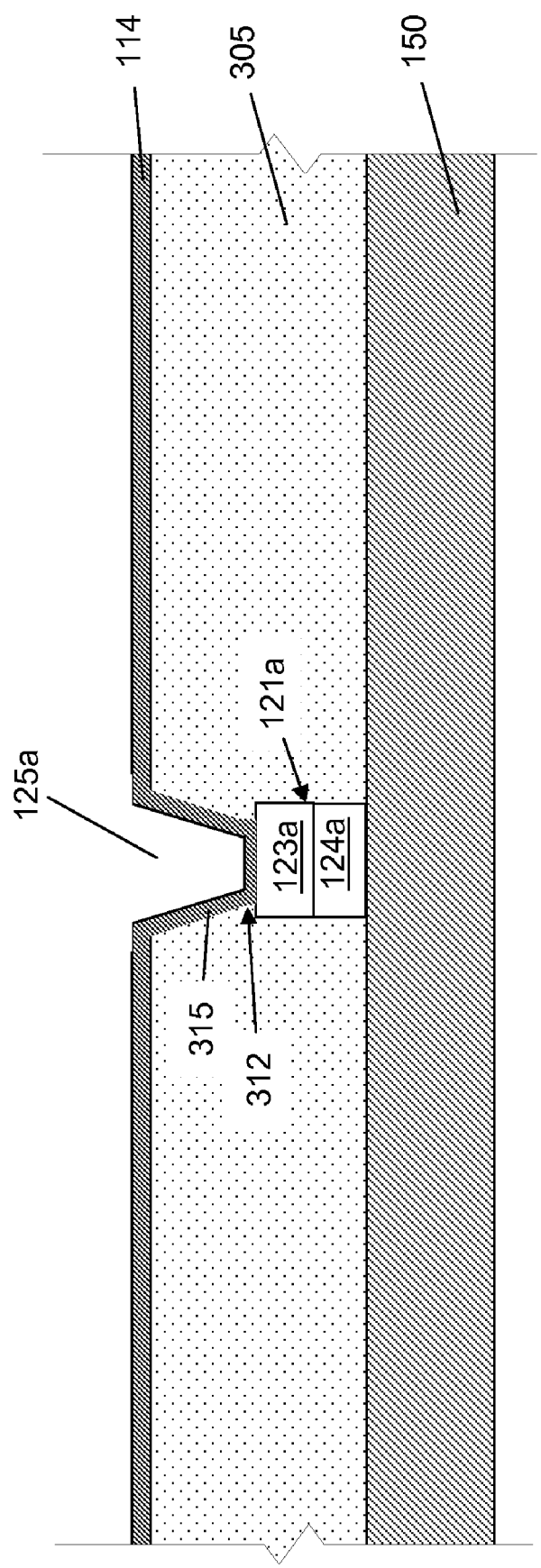

An electrically conductive material is next deposited, such as by physical vapor deposition, on the sacrificial material 305 and the upper surface of the hinge support posts 121a to form the hinge layer 114, as shown in FIG. 8. The deposited electrically conductive material also simultaneously forms one or more side layers 315 and a bottom layer 312 in the via 310 (step 445). The side layers 315 and the bottom layer 312 define a cavity 125a. The hinge connection post 122a is formed by the side layers 315 and the bottom layer 312. Examples of the electrically conductive material include titanium, a titanium-aluminum alloy, a titanium-nickel alloy and an aluminum-copper alloy. The simultaneous formation of the hinge layer 114, the side layers 315 and the bottom layer 312 combines several fabrication steps of other devices into one step and thus simplifies the fabrication of the micro mirror. The mechanical integrity and the strength of the mirror plate 110 are improved because the hinge layer 114, the side layers 315 and the bottom layer 312 are formed in a unitary layer.

Figure 9:
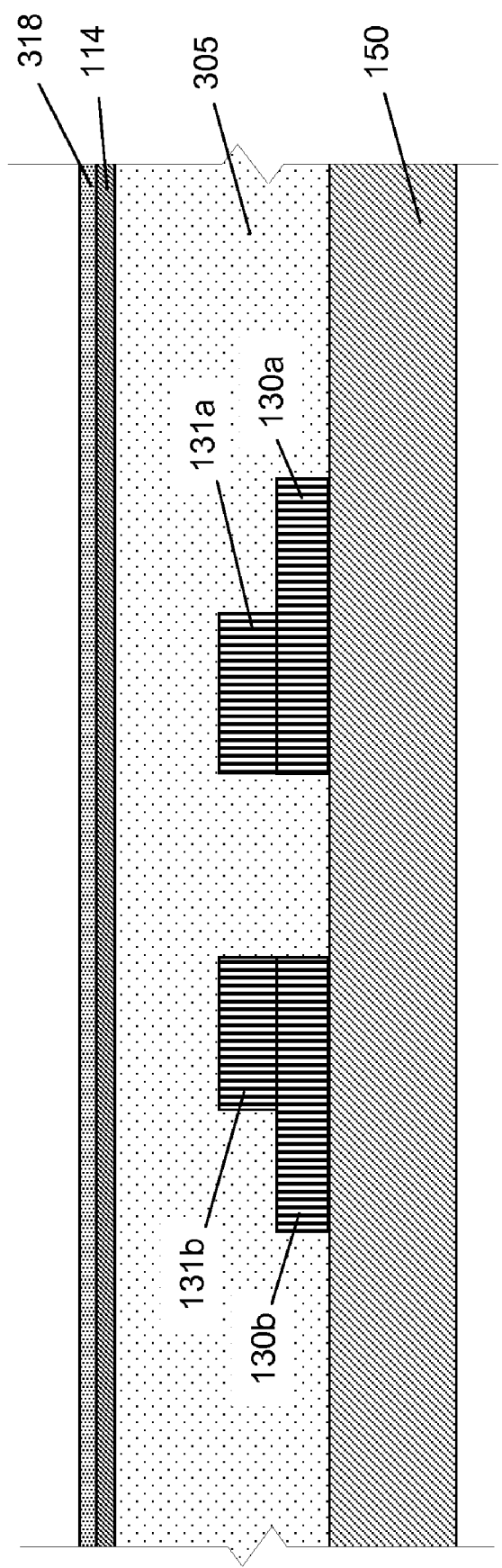
FIGS. 9-12 are cross-sectional views along line B-B of FIG. 2 showing several steps of fabricating the micro mirror on a substrate.
Figure 10:
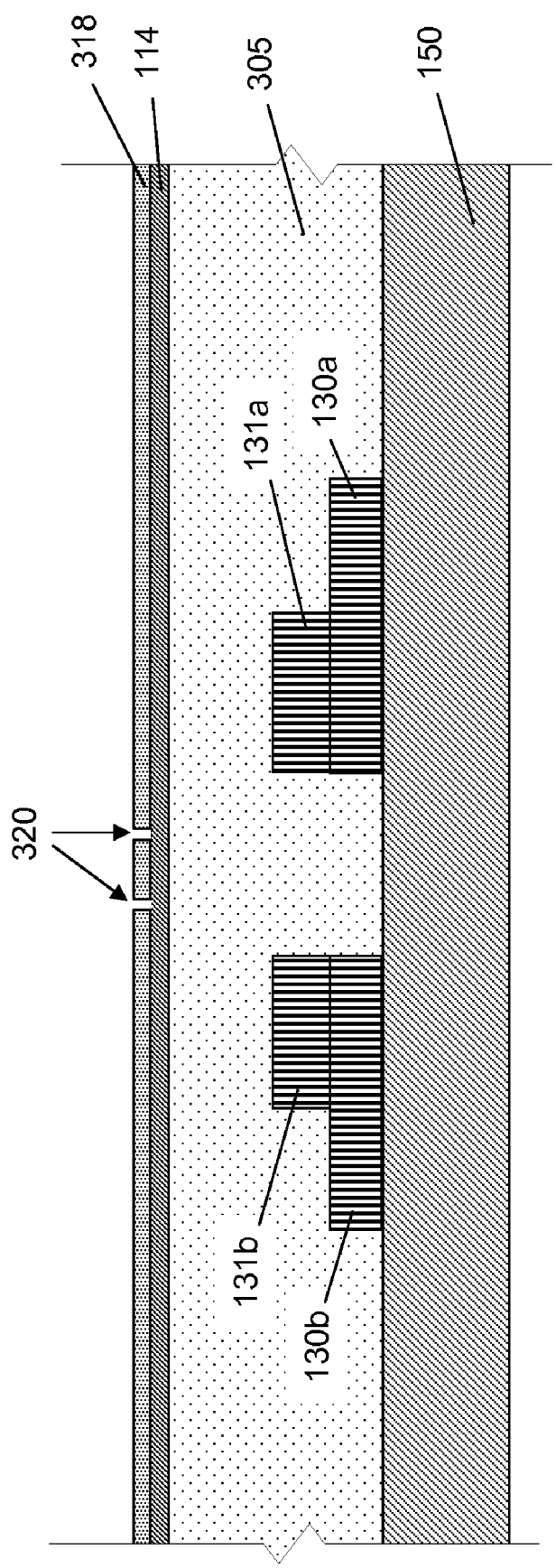
Figure 11:
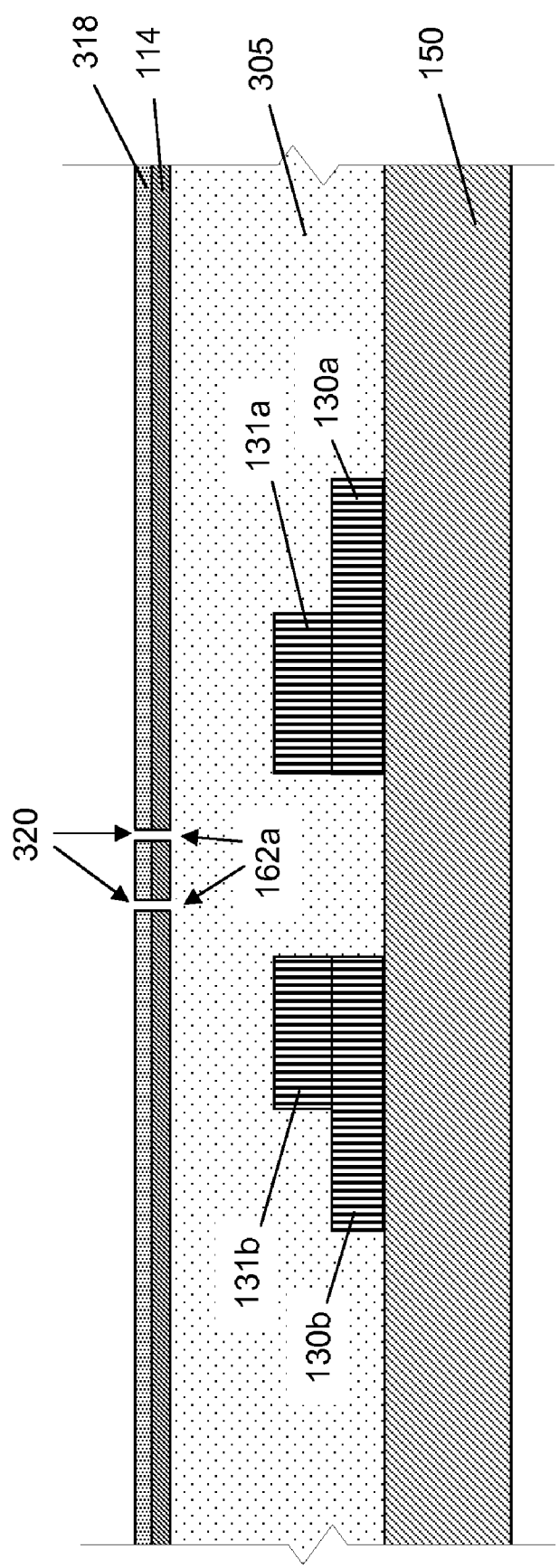
Figure 12:
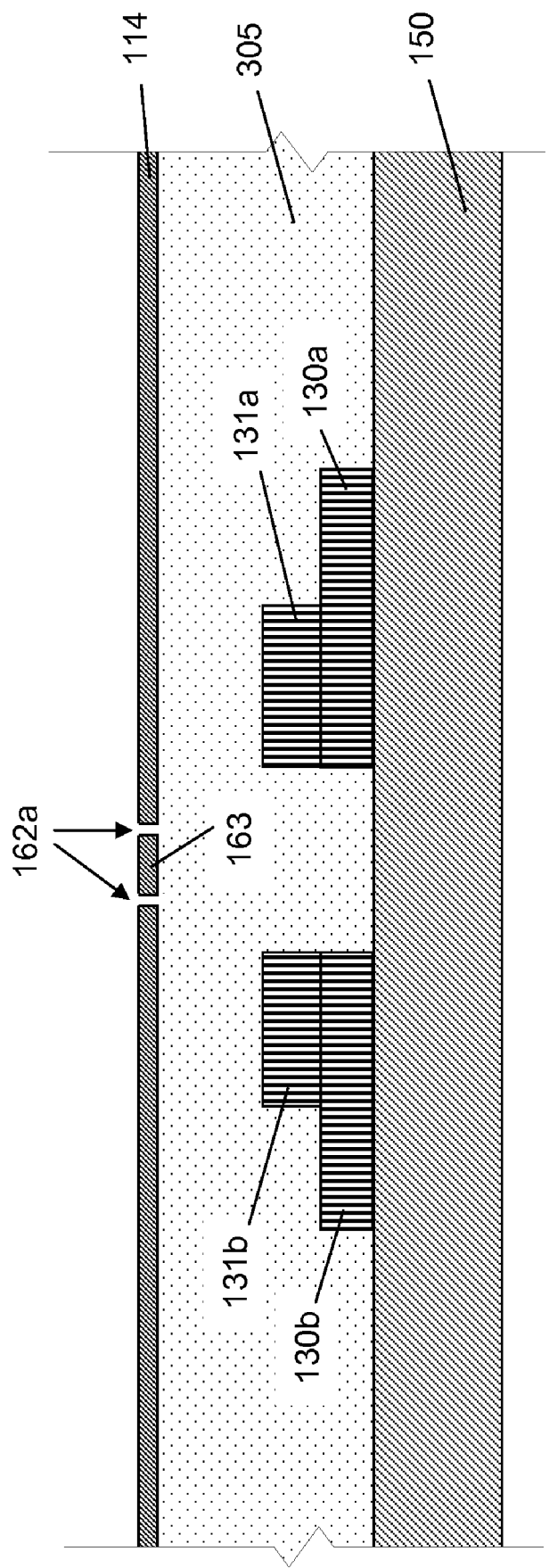

A photo resist layer 318 is then introduced over the hinge layer 114, the side layers 315 and the bottom layer 312, as shown in FIG. 9 (step 450). The photo resist layer 318 is patterned to form two openings 320 to expose the hinge layer 114. The photo resist layer 318 also includes recesses for forming the two pairs of holes 109a and 109b (not shown in FIG. 9). The hinge layer 114 is then etched to form the gaps 162a and the two pairs of holes 109a and 109b in the hinge layer 114 and under the openings 320, as shown in FIG. 11. The sacrificial material 305 is thus exposed in the holes 109a and 109b. The photo resist layer 318 is subsequently removed to define an elongated connection portion 163a in the hinge layer 114, as shown in FIG. 12.

Figure 13:
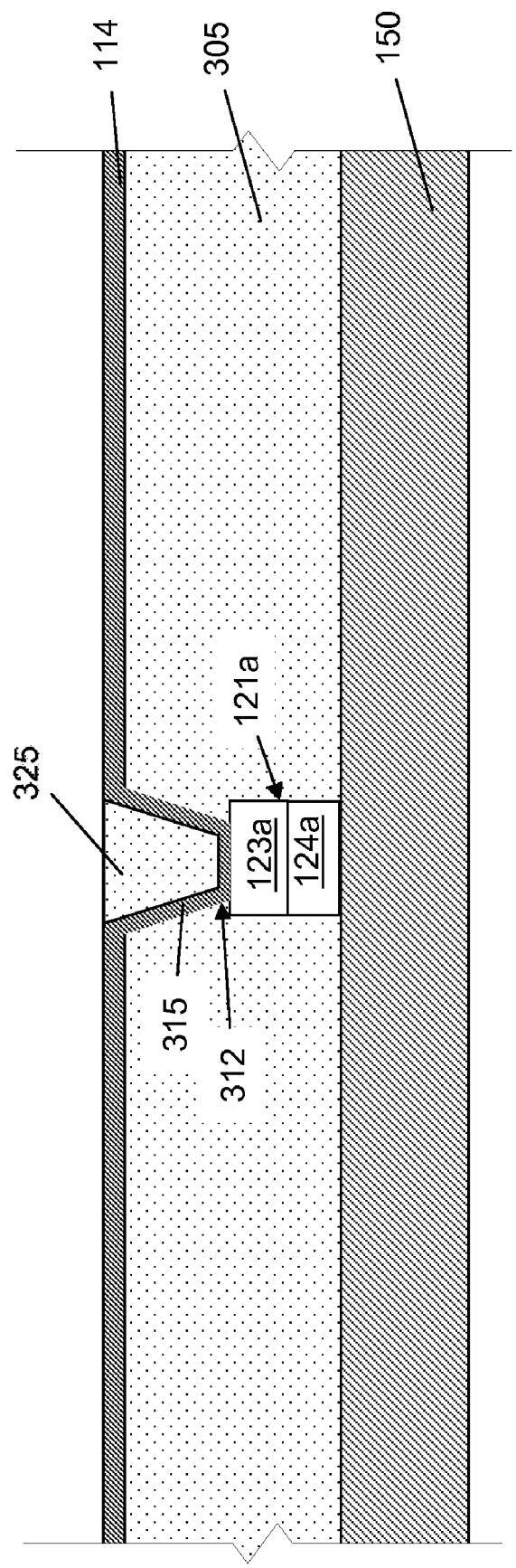
FIGS. 13-14 are cross-sectional views along line A-A of FIG. 2 showing several steps of fabricating the micro mirror on a substrate.

Referring to FIG. 13, a sacrificial material 325 such as a photo resist is disposed to fill the cavity 125a (step 455). The sacrificial material 325 allows a spacer layer 113 to be formed on the cavity 125a and the hinge layer 114 in the subsequent step. The sacrificial material 325 is also disposed on the sacrificial material 305 through the holes 109a and 109b and fills the holes 109a and 109b (not shown). The sacrificial material 325 can be spin-coated over the hinge layer and the cavity 125a or 125b (FIG. 8). The sacrificial material 325 on the hinge layer 114 is subsequently removed. Since a single spin coating may not dispose enough sacrificial material 325 to fill the cavity 125a, the sacrificial material 325 may be applied multiple times, each of which can be followed by removing the sacrificial material 325 from the top of the hinge layer 114. After the sacrificial material 325 is hardened, the upper surface of the sacrificial material 325 can be planarized by chemical mechanical polishing. After the planarization, the top of the sacrificial material 325 is at substantially the same height as the upper surface of the hinge layer 114.

Figure 14:
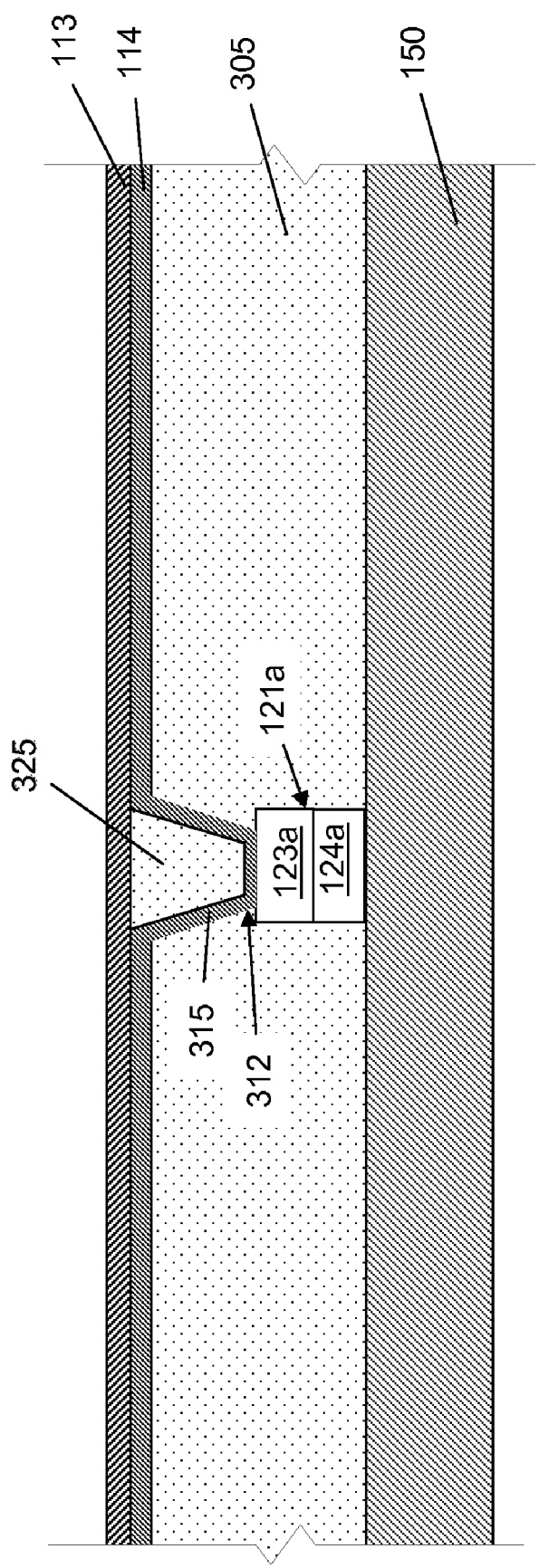
Figure 15:
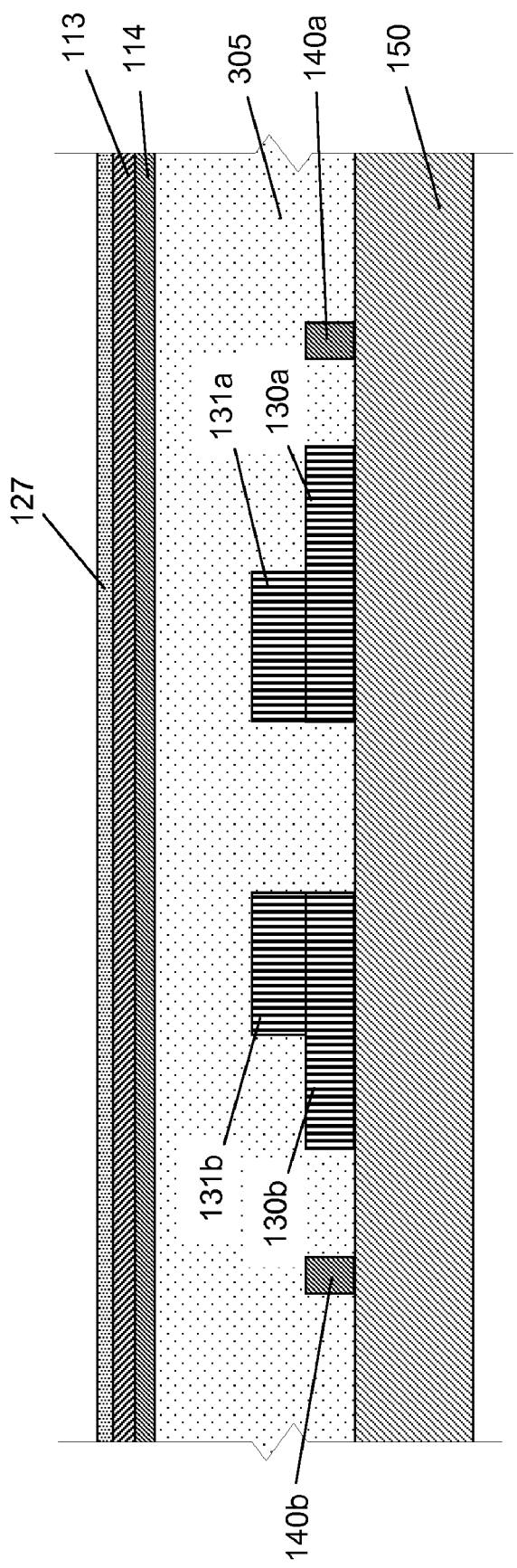
FIGS. 15, 16, 17A, 18A, 19A and 20A are cross-sectional views along line C-C of FIG. 2 showing several steps of fabricating the micro mirror on a substrate.
Figure 16:
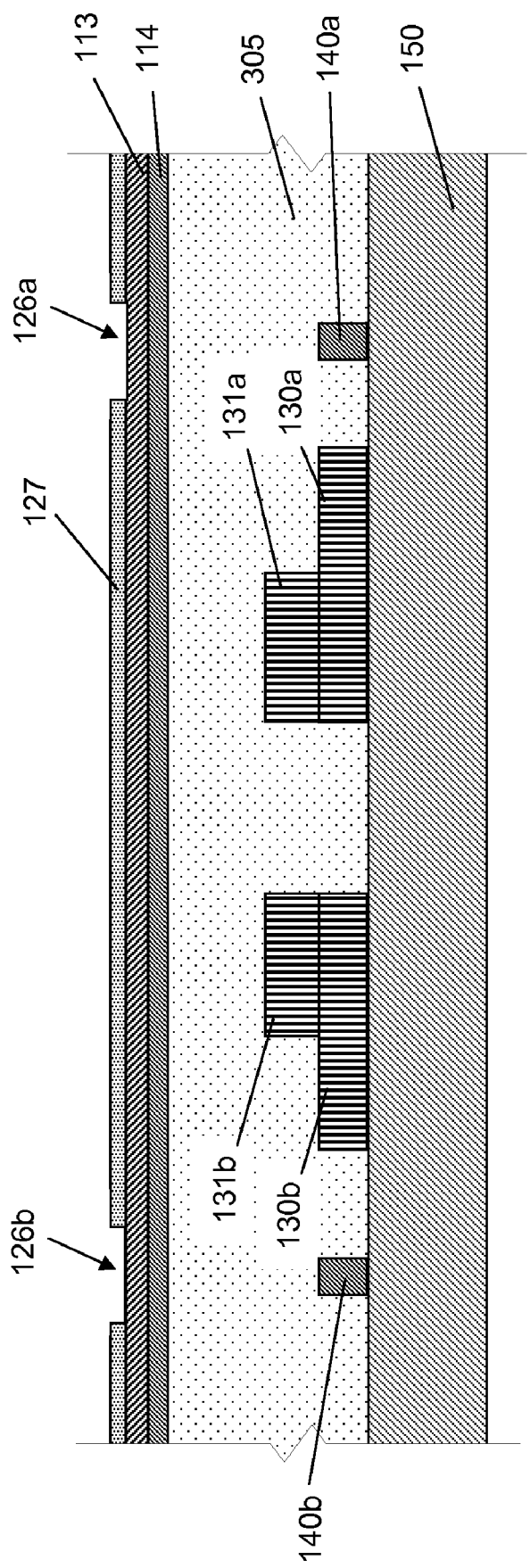
Figure 17A:
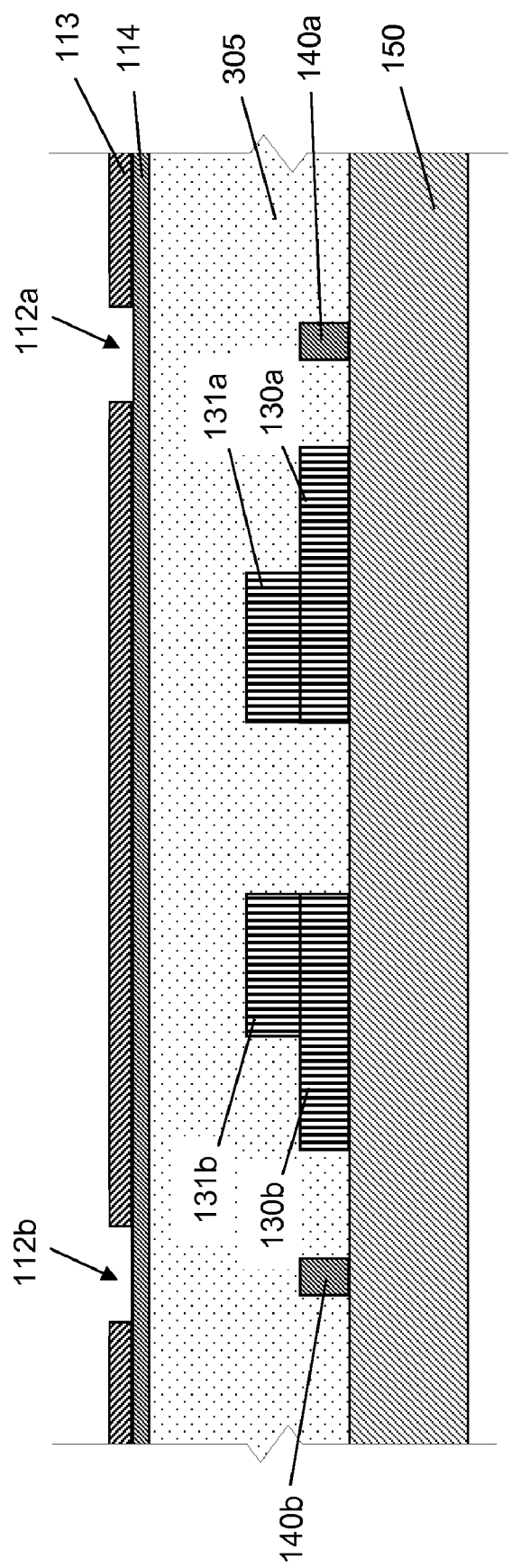
Figure 17B:
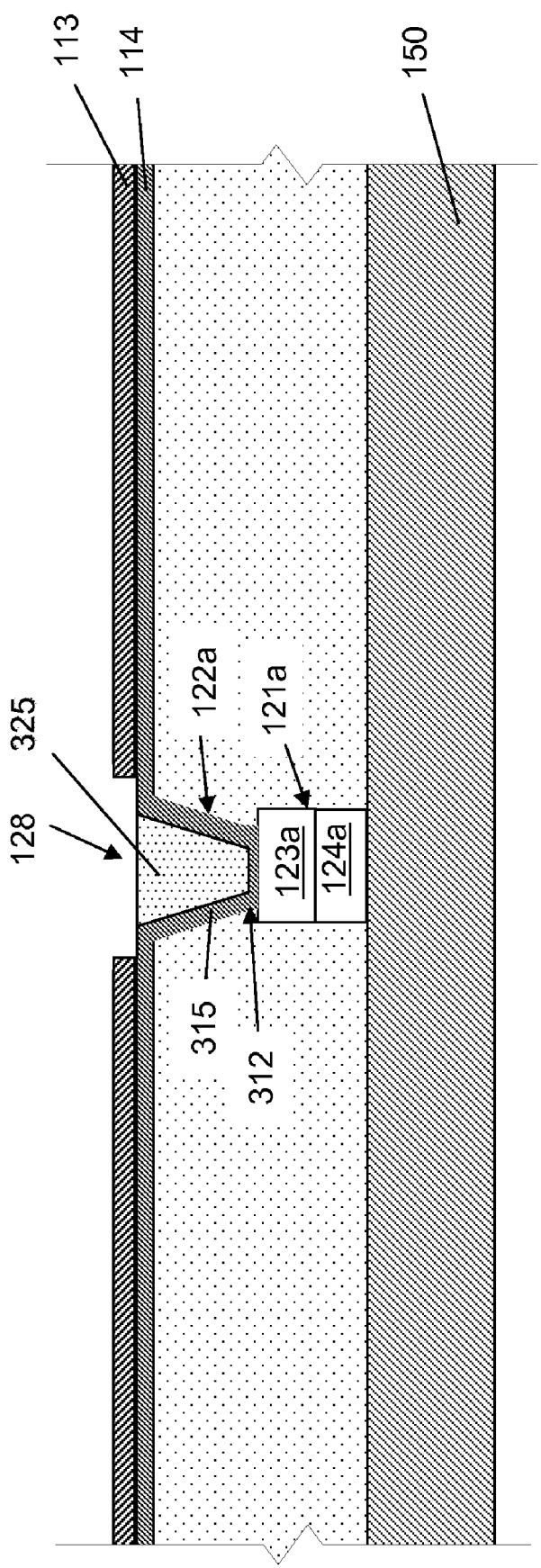
FIG. 17B is a cross-sectional view along line A-A of FIG. 2 showing the formation of a cavity in the spacer layer.
Figure 18A:
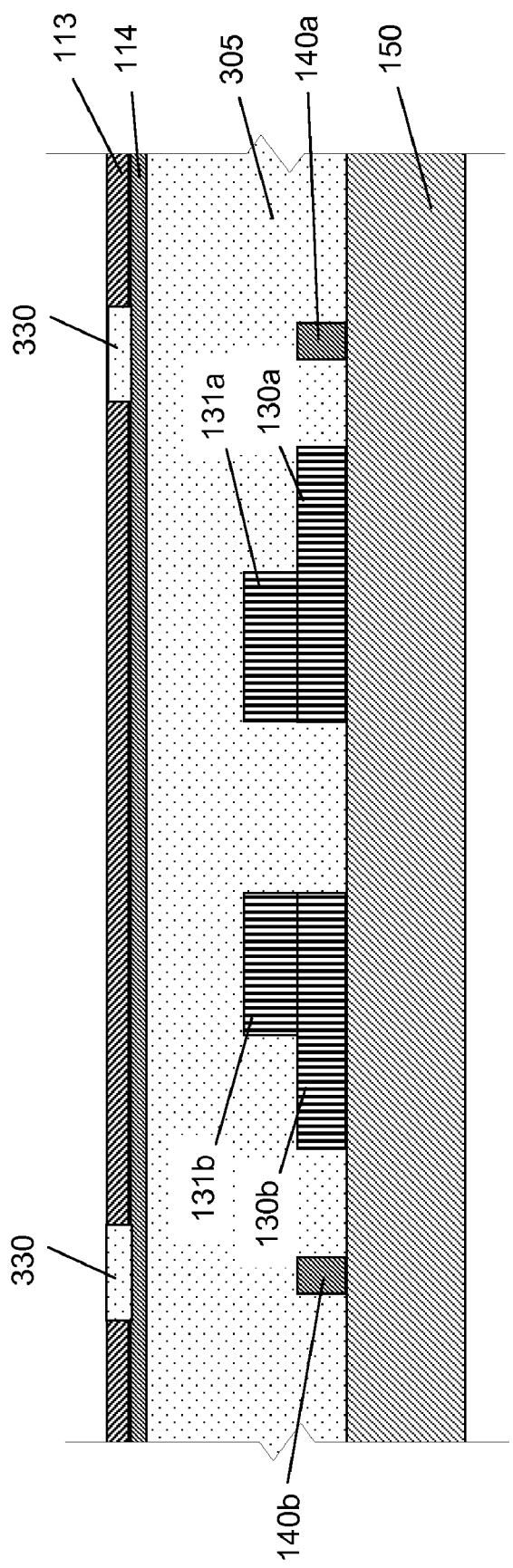

A spacer layer 113 is next deposited on the hinge layer 114, as shown in FIG. 14 (step 460). The spacer layer 113 can be formed for example of amorphous silicon material. A photo resist layer 127 is next spin coated over the spacer layer 113, as shown in FIG. 15 (step 465). The photo resist layer 127 is then patterned to form recesses 126a and 126b to expose the upper surface of the spacer layer 113 above the landing stops 140a, 140b, as shown in FIG. 16. A recess is also formed the photo resist layer 127 over the hinge 113. The spacer layer 113 is then etched in the exposed areas in the recesses 126a and 126b to form the cavities 112a and 112b, as shown in FIG. 17A. The spacer layer 113 is also etched to form a cavity 128 above the hinge component 120a, as shown in FIG. 17B. The cavities 112a and 112b and the two pairs of holes 109a and 109b are then filled with a sacrificial material 330, as shown in FIG. 18A.

Figure 18B:
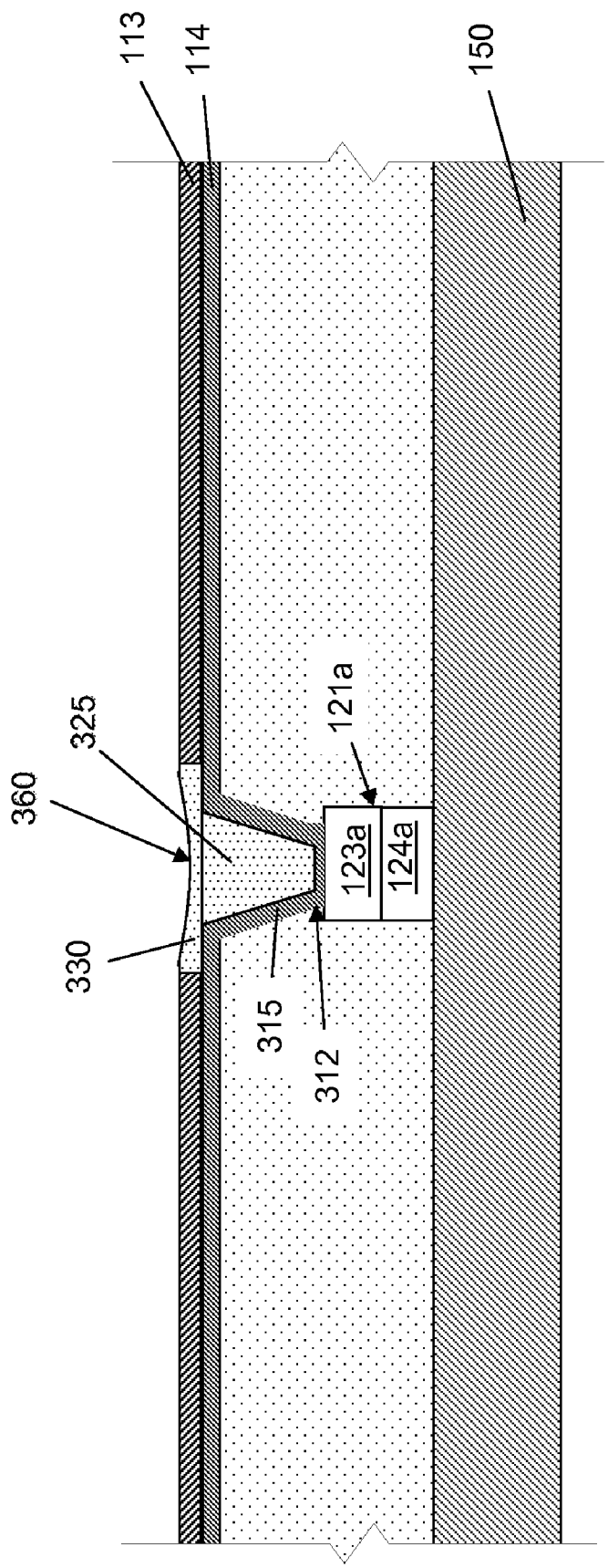
FIG. 18B a cross-sectional view along line A-A of FIG. 2 showing a recess formed in the upper surface of the sacrificial material over the cavity in the spacer layer.
Figure 18C:
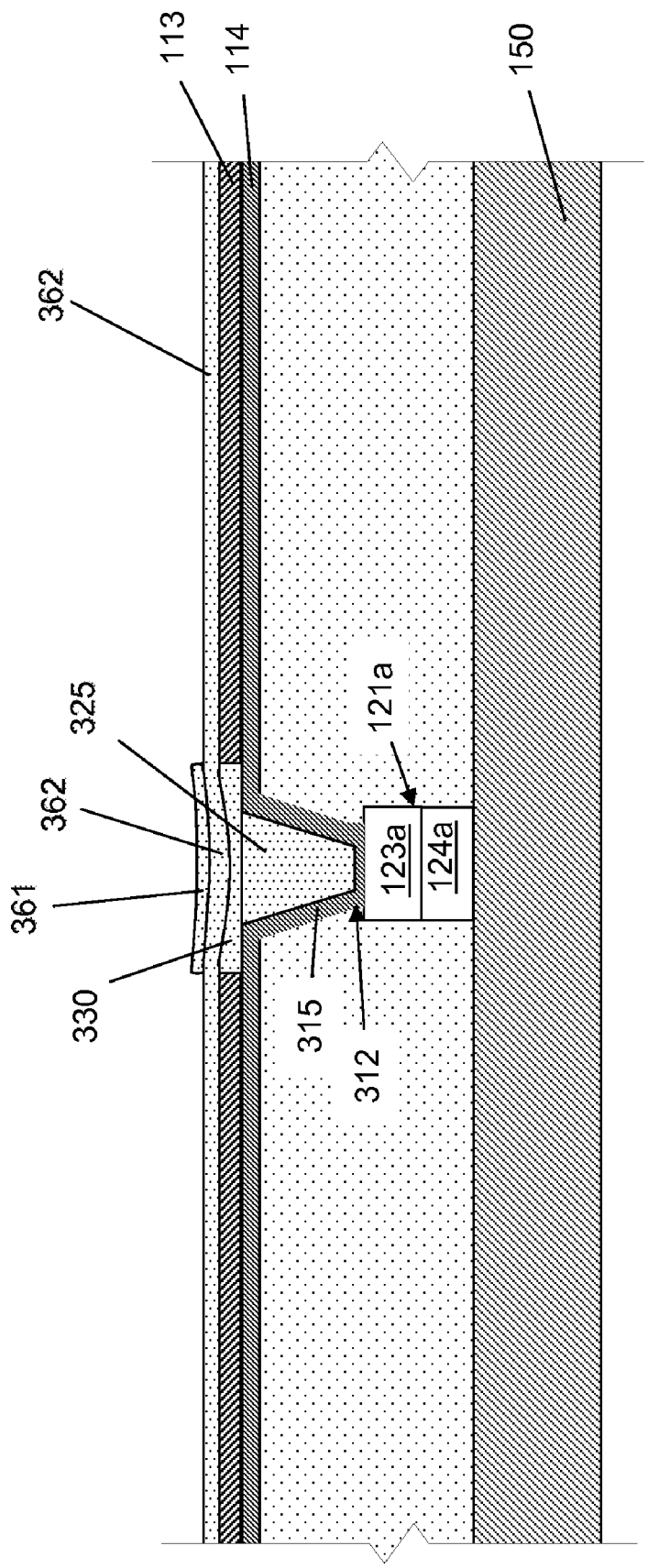
FIG. 18C a cross-sectional view along line A-A of FIG. 2 showing the formation of a compensatory layer over the recess shown in FIG. 18B.
Figure 19A:
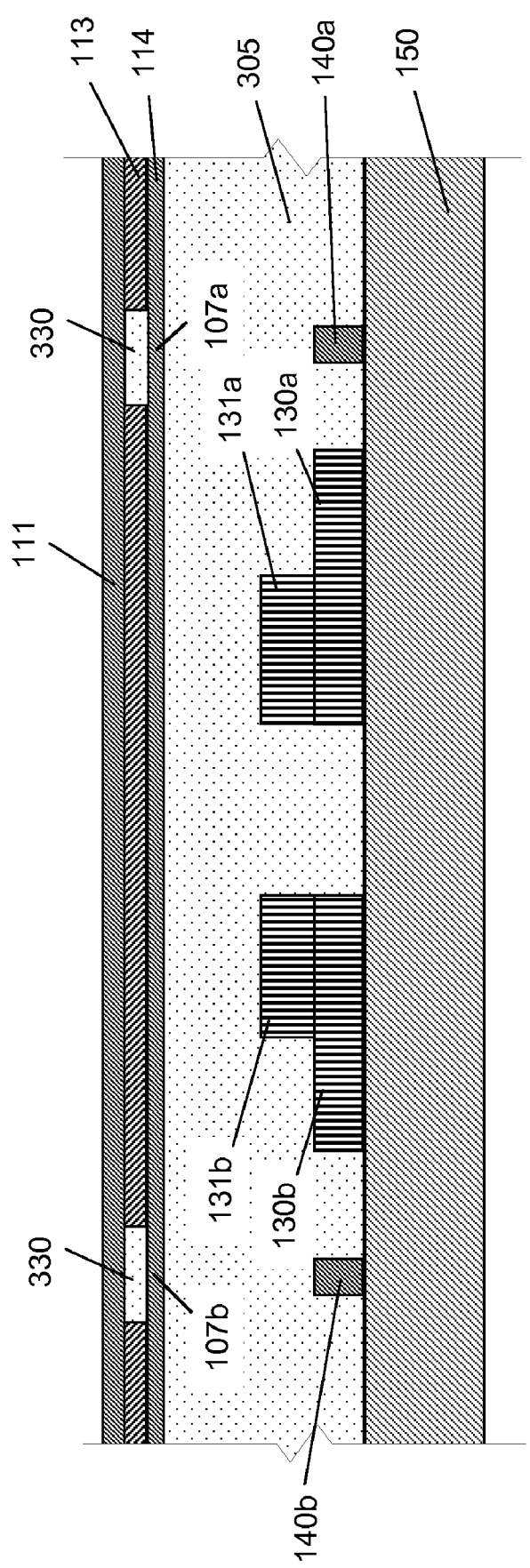

The cavity 128 is also filled by the sacrificial material 330, as shown in FIG. 18B. The sacrificial material 330 in the holes 109a and 109b contacts the sacrificial material 305 that is between the hinge layer 114 and the substrate 150 (step 467). The upper surface of the sacrificial material 330 tends to sag after baking and curing of the sacrificial material 330. As a result, a recess 360 forms in the upper surface of the sacrificial material 330. The depth of the recess 360 depends on the width and the thickness of the cavity 128 and the properties of the sacrificial material 330. For example, the cavity 128 can be about 0.5 micron to 2.0 micron wide and 0.2 micron to 1 micron deep. The sacrificial material 330 can made of a photo resist. The height drop at the center of the recess 360 can be in the range of 0.01 to 0.1 microns. The recess 360 can cause the reflective layer 111 that is subsequently formed over the spacer layer 113 to sag. Specifically, the sag is in the part of the reflective layer that is unsupported from below. A sag in part of the reflective layer produces a dimple on the upper surface on the reflective layer 111. An uneven reflective surface in the mirror plate 110 can cause light to be reflected in unwanted directions. Light scattering can lower the brightness and contrast of the display image formed by the micromirror-based SLM.

Figure 19B:
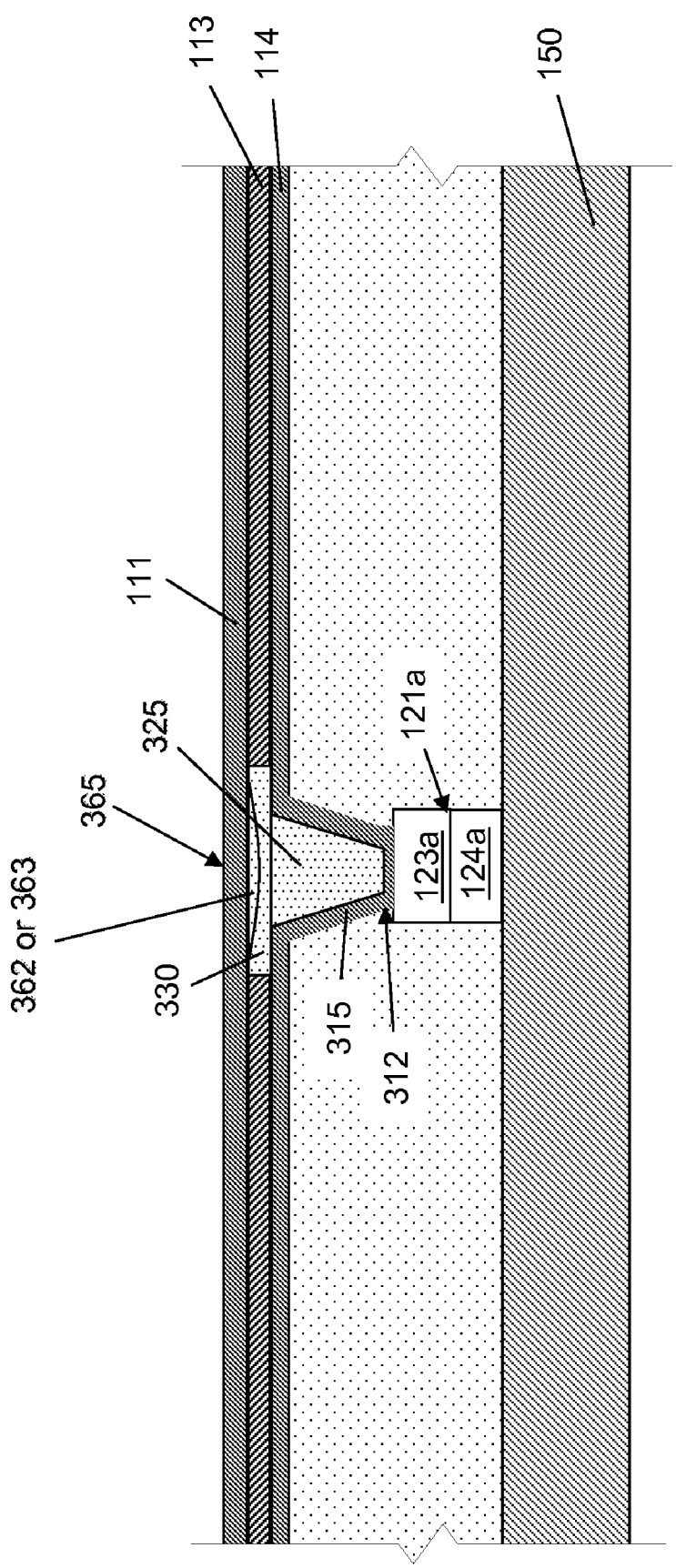
FIGS. 19B and 20B are cross-sectional views along line A-A of FIG. 2 showing several steps of fabricating the micro mirror on a substrate.

In accordance with the present specification, a flat surface can first be prepared before the deposition of the reflective layer 111 (FIGS. 19A and 19B). A flat temporary supporting layer below the flat reflective layer 111 can allow for forming a flat reflective surface on the micro plate 110. In some embodiments, referring to FIG. 18C, a layer 362 is deposited on the recess 360 (FIG. 18B) and the spacer layer 113. A compensatory layer 361 is formed on the layer 362 and over the recess 360 (FIG. 18B). The compensatory layer 361 and the layer 362 can be made of a same material as the sacrificial material 330. The compensatory layer 361 can include photo resist, silicon, silicon dioxide, etc. The formation of the compensatory layer 361 can include deposition of a thick layer, followed by lithographic patterning, and partial etching to form the compensatory layer 361 on the etched layer 362.

Figure 18D:
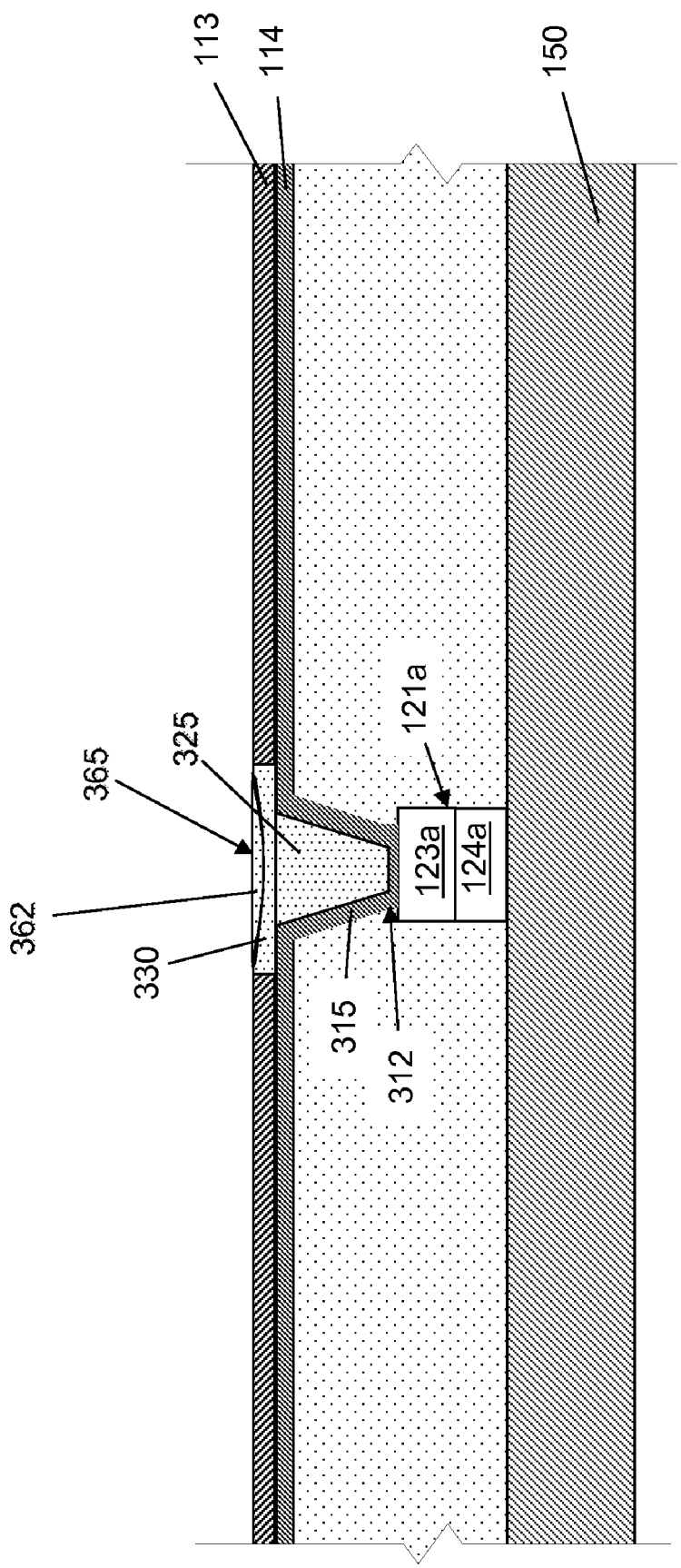
FIG. 18D a cross-sectional view along line A-A of FIG. 2 showing the formation of a flat upper surface on the sacrificial material filling the cavity in the spacer layer using the process shown in FIGS. 18B and 18C.

The compensatory layer 361 and the layer 362 are then etched back by isotropic etching, such as plasma etching. The isotropic etching can remove the compensatory layer 361 and the much of the layer 362 except for a portion on the sacrificial material 330. The isotropic etch can remove materials from the compensatory layer 361 and the layer 362 as well as smoothen the surface. The portion of the layer 362 on the spacer layer 113 is removed to expose the upper surface of the spacer layer, as shown in FIG. 18D. A flat surface 365 is formed on the sacrificial material 330 and a remainder portion of the layer 362 over the sacrificial material 330 (step 468). The flat surface 365 is co-planar with the upper surface of the spacer layer 113.

An advantage of surface planarization using a compensatory layer is material saving. Without the compensatory layer, the layer 362 has to be much thicker to allow isotropic etching to smoothen out the recess 360 on the upper surface of the layer 362 during material removal and to form a flat surface over the sacrificial material 330.

Figure 18E:
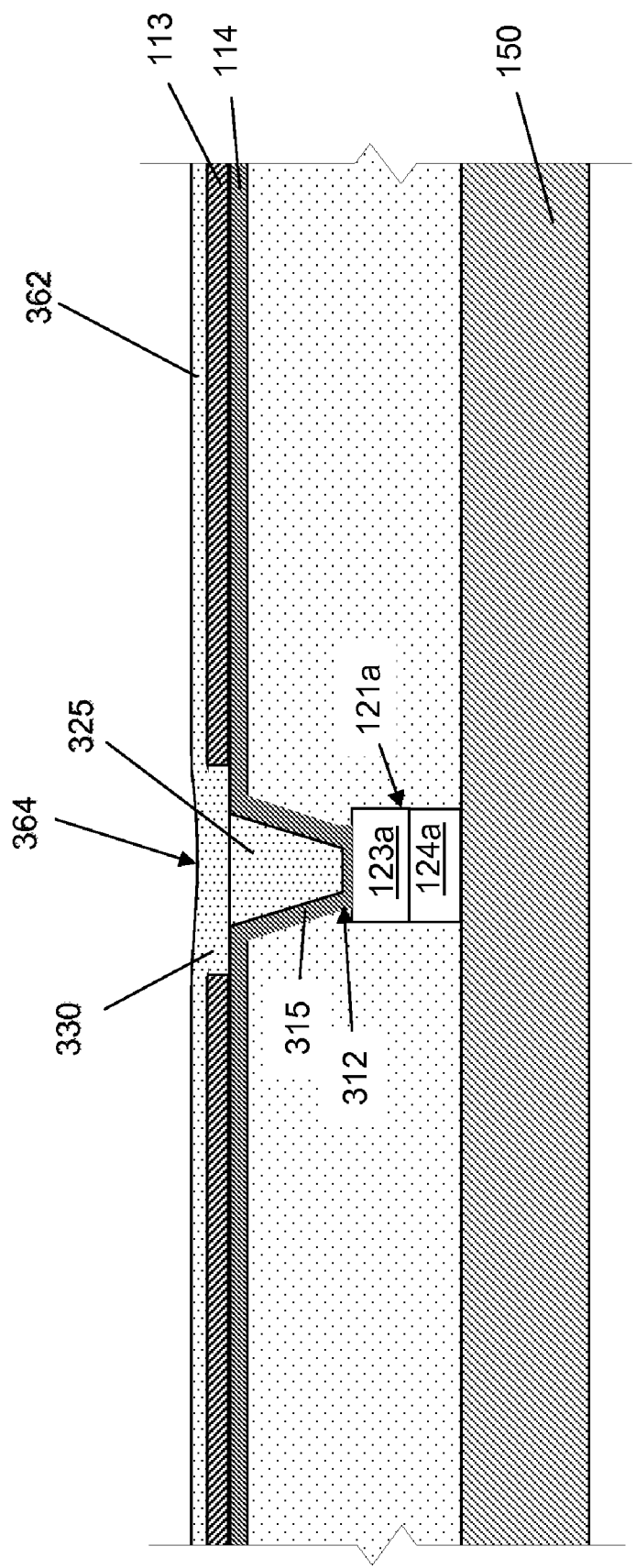
FIG. 18E a cross-sectional view along line A-A of FIG. 2 showing the formation of a layer of sacrificial material on the spacer layer and in a cavity in the spacer layer, wherein a recess is formed in the upper surface of the sacrificial material over the cavity in the spacer layer.
Figure 18F:
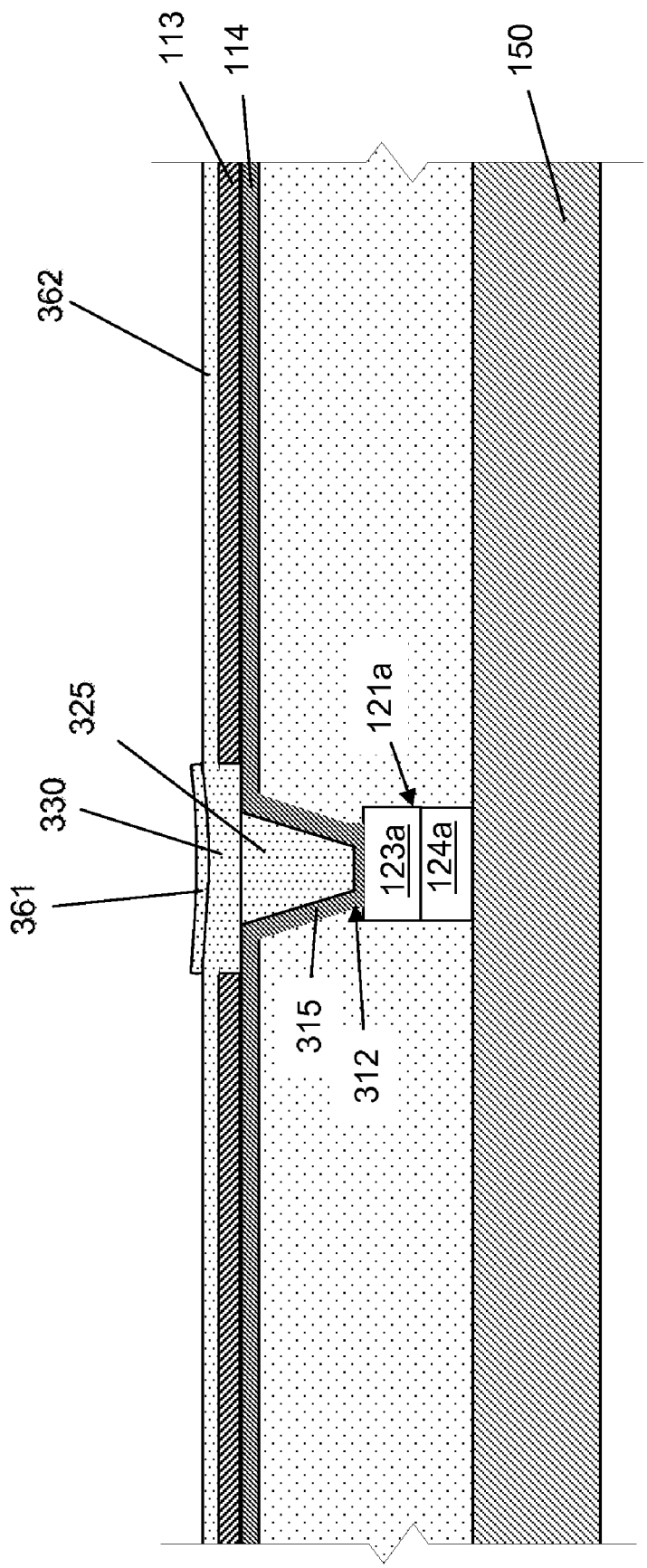
FIG. 18F a cross-sectional view along line A-A of FIG. 2 showing the formation of a compensatory layer over the recess shown in FIG. 18E.
Figure 18G:
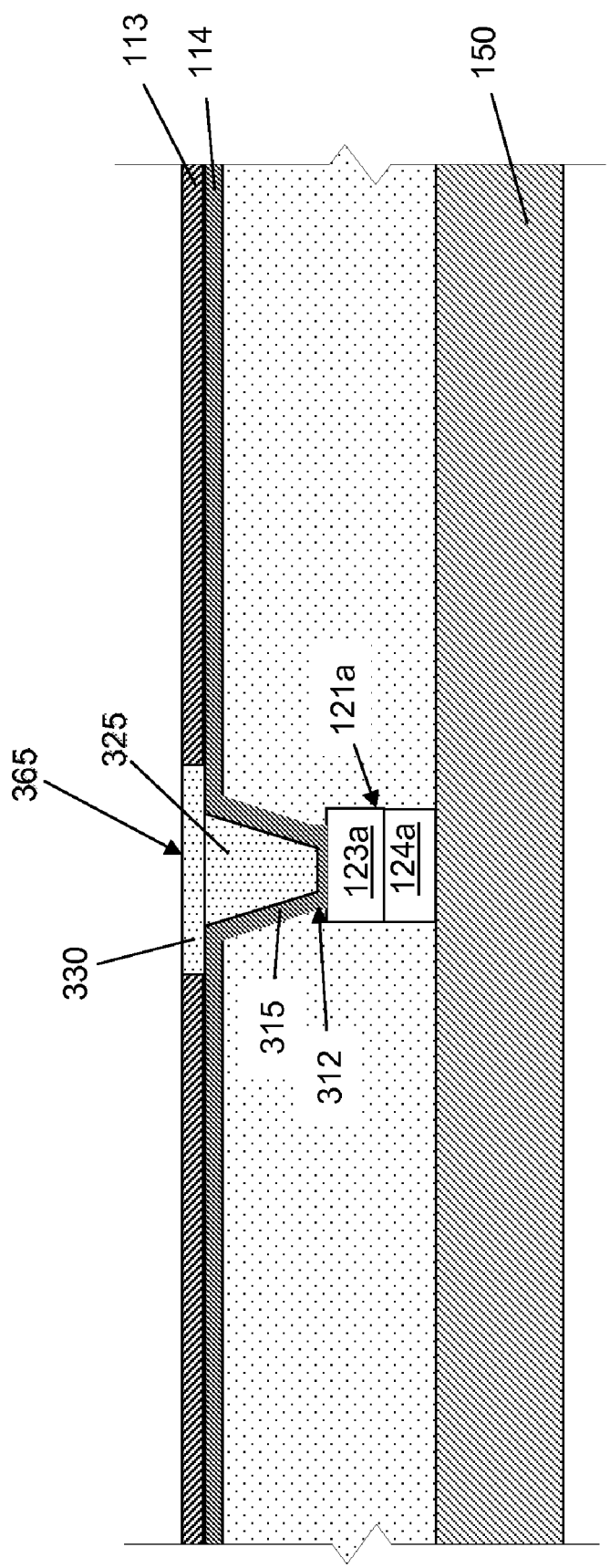
FIG. 18G a cross-sectional view along line A-A of FIG. 2 showing the formation of a flat upper surface on the sacrificial material filling the cavity in the spacer layer using the process shown in FIGS. 18E and 18F.

In some embodiments, the filling of the cavity 128 by a sacrificial material and the formation of the layer 362 can be combined into one step. Referring to FIG. 18E, a sacrificial material 330 is deposited to fill the cavity 128 and to form a layer on the spacer layer 113 and on the cavity 128. After drying and hardening, the sacrificial material 330 may include a dimple 364 in the upper surface of the sacrificial material 330 and over the cavity 128. A compensatory layer 361 is formed next at the dimple 364 on the sacrificial material 330, as shown in FIG. 18F. The formation of the compensatory layer 361 can include deposition of a thick layer, followed by lithographic patterning, and partial etching to form the compensatory layer 361 on the etched layer 362. The compensatory layer 361 and the sacrificial material 330 are then etched back by isotropic etching, such as by plasma etching. A flat upper surface 365 can be formed after the isotropic etching on the sacrificial material 330 as shown in FIG. 18G. The flat upper surface 365 is substantially co-planar with the upper surface of the spacer layer 113.

Figure 18H:
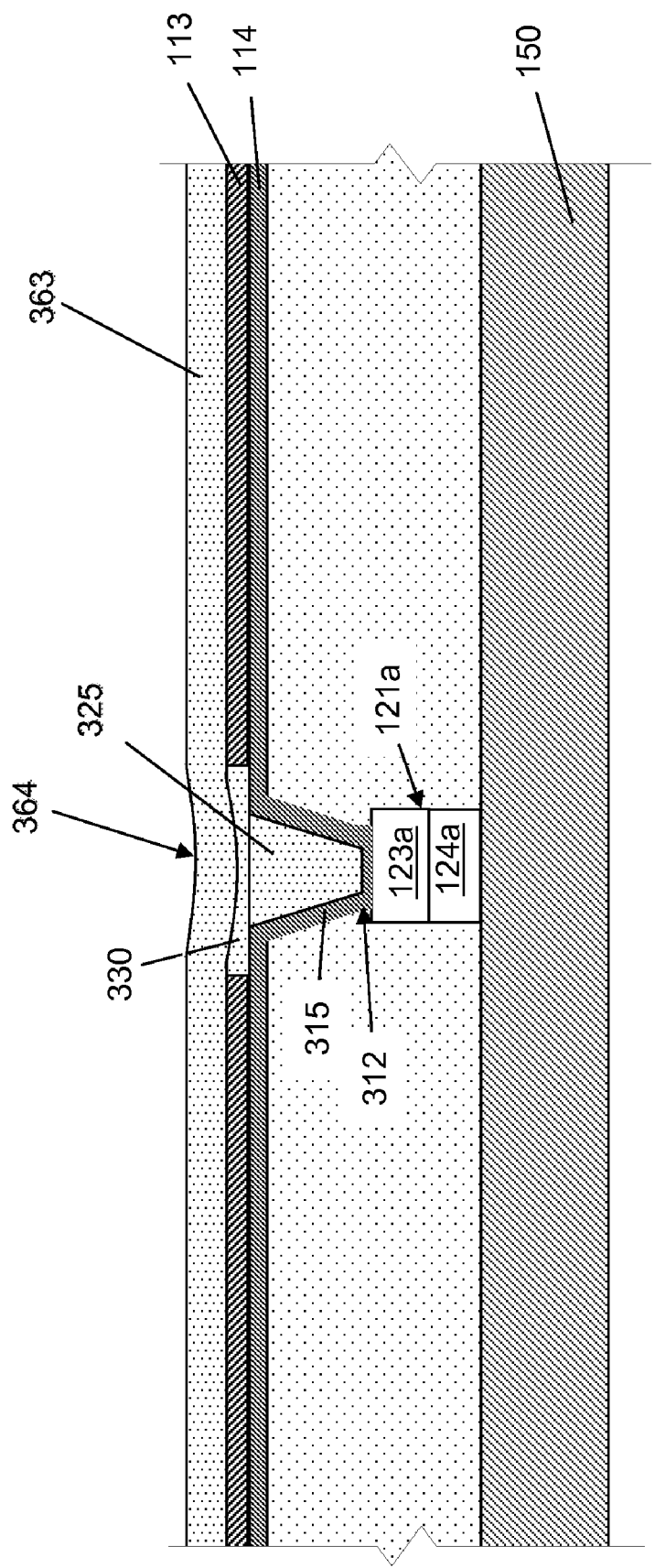
FIG. 18H a cross-sectional view along line A-A of FIG. 2 showing the formation of a photo-resist layer on the spacer layer and the sacrificial material in the cavity in the spacer layer.
Figure 18I:
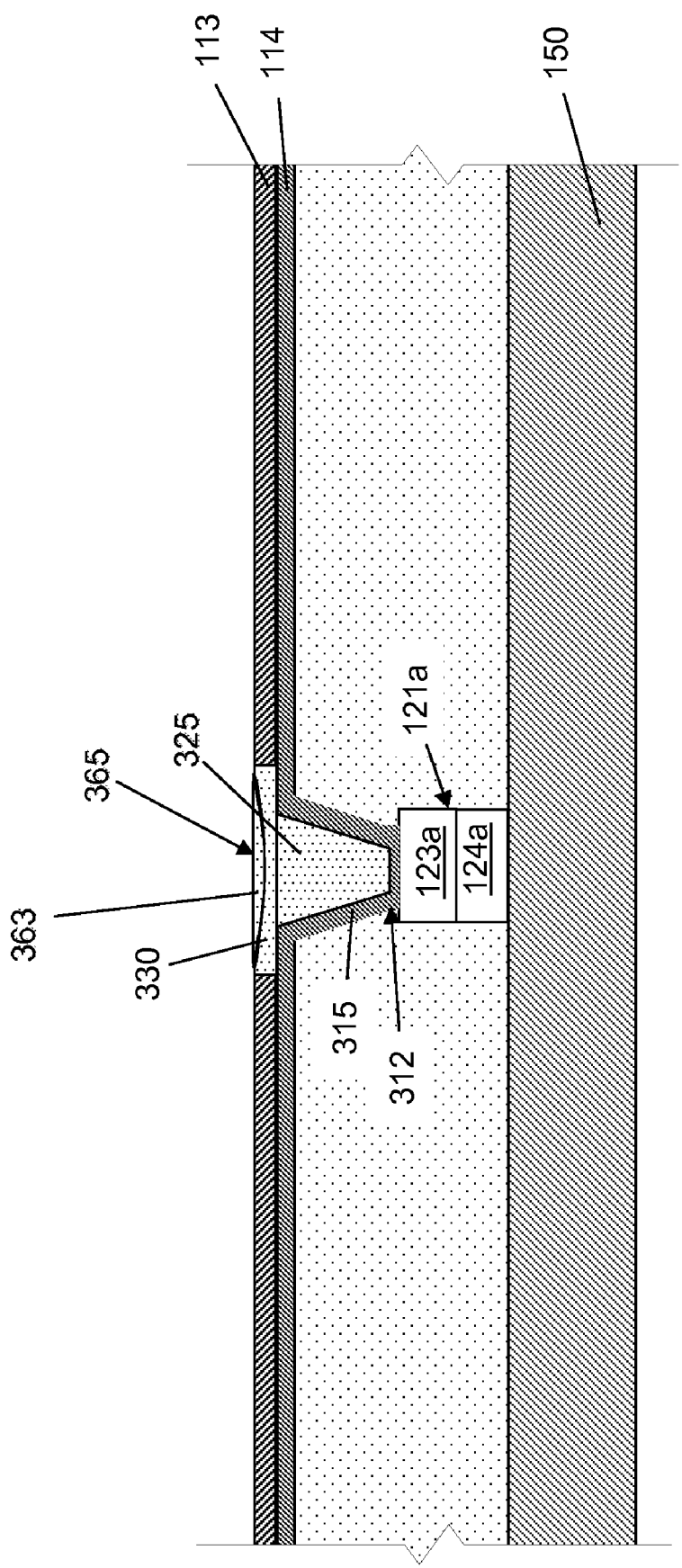
FIG. 18I a cross-sectional view along line A-A of FIG. 2 showing the formation of a flat upper surface on the sacrificial material filling the cavity in the spacer layer using the process shown in FIG. 18H.

In some embodiments, referring to FIG. 18H, a photo-resist layer 363 is spin coated on the spacer layer 113 and the sacrificial material 330. The photo-resist layer 363 may have a dimple 364 over the sacrificial material 330. The photo-resist layer 363 is hardened by baking after the spin-coating. Chemical mechanical polishing is then applied to the hardened photo-resist layer 363 to remove the portion of the photo-resist layer 363 on the spacer layer 113 and to leave a portion of the photo-resist layer 363 on the sacrificial material 330 to form a flat surface 365 co-planar with the upper surface of the spacer layer 113, as shown in FIG. 18I (step 468). The flat surface 365 is substantially flat, that is the height variation of the flat surface 365 is much smaller than the wavelength of light. For example, the height variation of the flat surface 365 can be smaller than 0.1 microns, or 0.05 microns, or 0.02 microns.

A reflective layer 111 is next deposited on the spacer layer 113 and the flat upper surface 365 formed on the remainder of the layers 362 or 363 and the sacrificial material 330, as shown in FIGS. 19A and 19B (step 470). Since the flat surface 365 is co-planar with the upper surface of the spacer layer 113, the reflective layer 111 can be formed to have a uniform and flat upper reflective surface. The height variation of the upper surface of the reflective layer 100 can be controlled to below 0.1 micron, such as 0.05 microns, or 0.02 microns using the processes described in relation with FIGS. 18B-18I. Suitable materials for the reflective layer 112 can include gold, aluminum and gold/aluminum alloys.

Figure 20A:
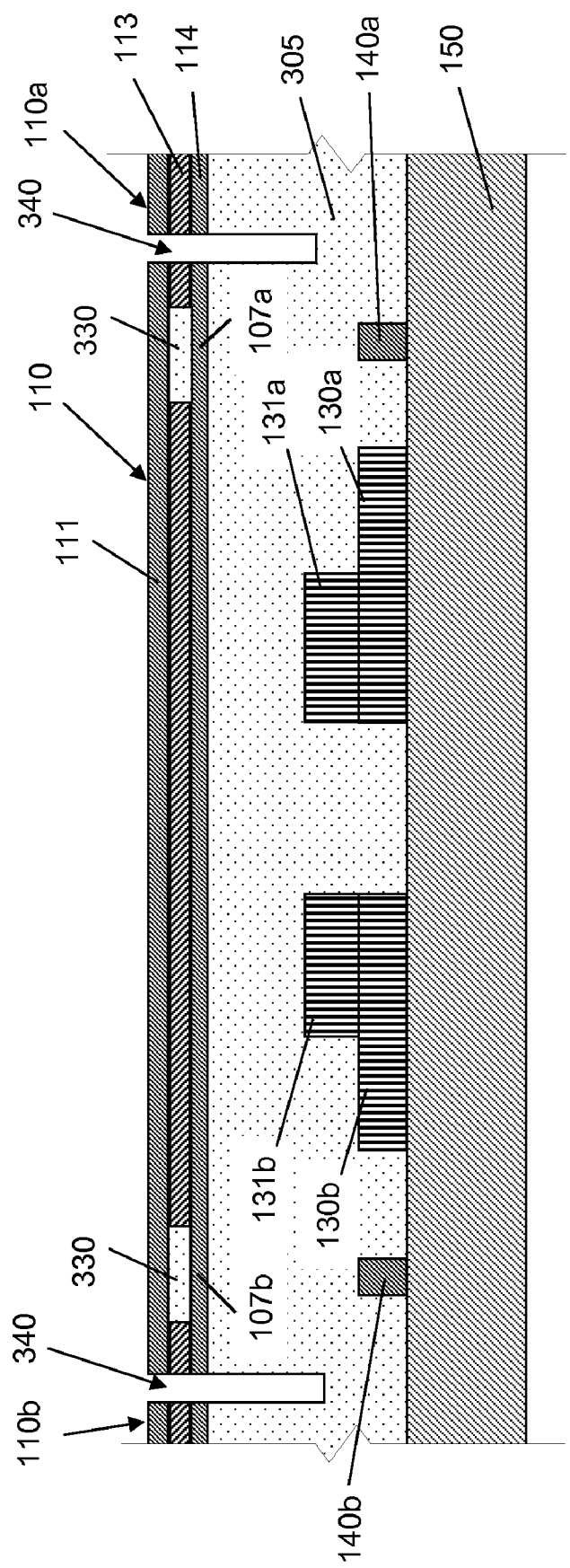
Figure 20B:
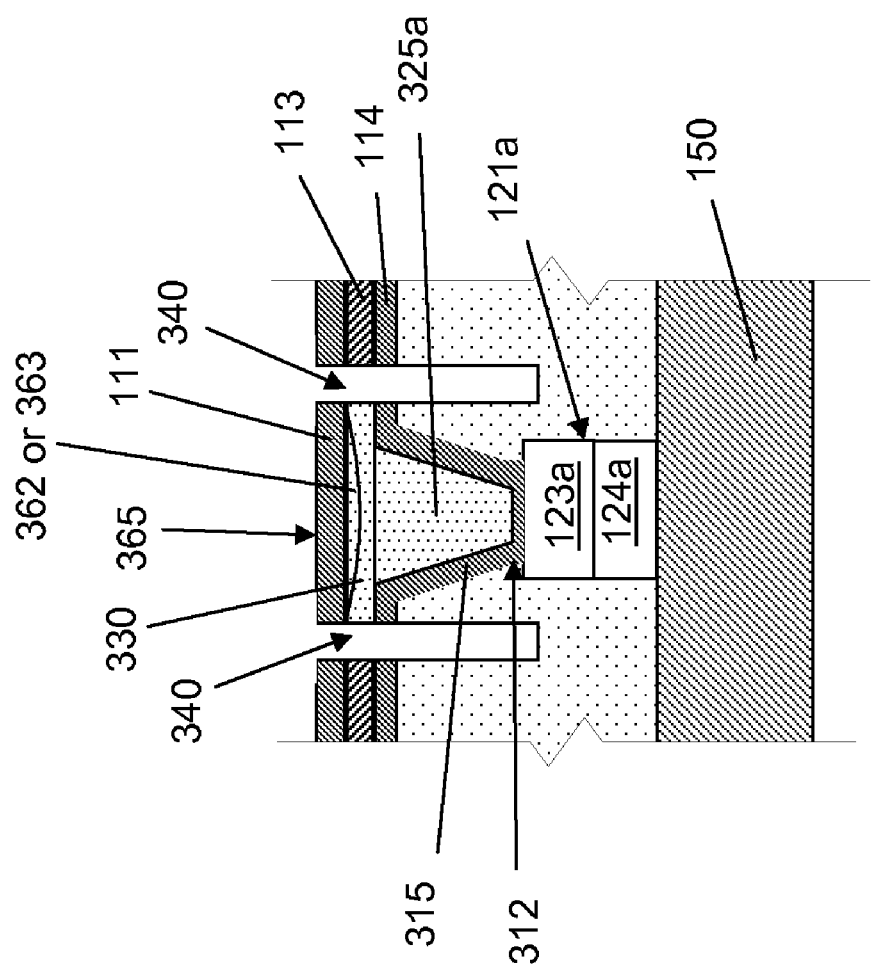
Figure 21:
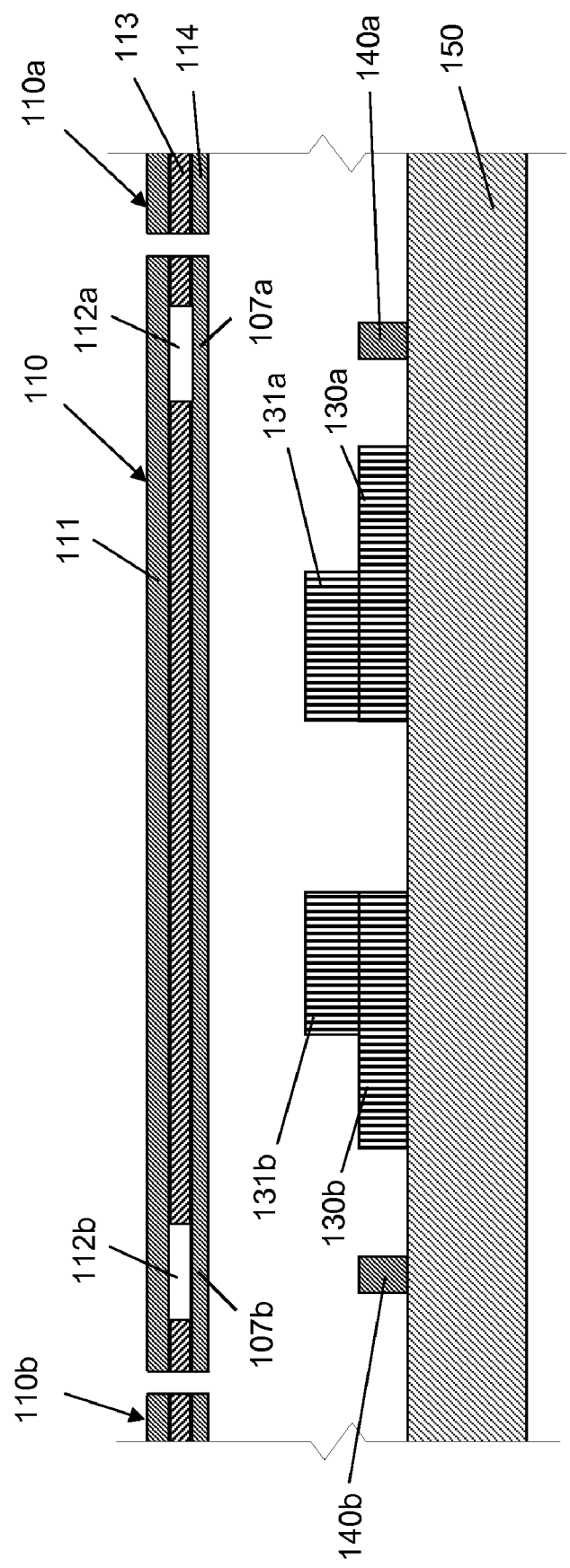
FIGS. 21 and 22 are cross-sectional views along the lines C-C and A-A, respectively, of FIG. 2 showing the micro mirror formed on the substrate.

Openings 340 are next formed using lithography to define the boundaries of each mirror plate 110, as shown in FIGS. 20A, 20B (step 475). That is, the openings 340 separate a mirror plate 110 from its adjacent mirror plates 110a, 110b and expose the sacrificial material 305.

The sacrificial materials 305, 325 and 330 are removed to separate the mirror plate 110, as shown in FIGS. 21 and 22 (step 480). The mirror plate 100 includes the reflective layer 111, the spacer layer 113 and the hinge layer 114. The hinge connection posts 122a and 122b include one or more side layers 315, a bottom layer 312 and a cavity 125a or 125b in the center. The hinge component 120a is connected to the side layer 315 of the hinge connection post 122a. The hinge connection post 122a is further connected to the hinge support post 121a on the substrate 150. The hinge layer 114, the hinge connection posts 122a, 122b and the hinge support posts 121a, 121b are electrically conductive to allow the electric potential of the hinge layer 114 to be controlled by an electric circuit in the substrate 150.

The mirror plate 110 can tilt about an axis defined by the hinge components 120a, 120b under an electrostatic torque produced by an electric potential difference between the hinge layer 114 and the electrode 130a-131b on the substrate 150. The tilt movement of the mirror plate 110 can be stopped when the bridge 107a or 107b comes to contact with a landing stop 140a or 140b. The landing stops 140a and 140b can define the mirror plate 110 at precise tilt angels at which the reflective layer 111 can reflect an incident light in a predetermined direction. The electrostatic force can produce a distortion in the bridge 107a or 107b. The stored elastic energy can be released to help the separation of the mirror plate 110 from the landing stop 107a or 107b when the electrostatic force is removed or reversed.

In some embodiments, the dimensions of the micro mirrors are as follow. The hinge component 120a, 120b can be about 2-7 μm long, about 0.2-0.6 μm wide and about 0.04-0.1 μm thick. The hinge support posts 121a, 121b can be about 0.5-1.1 μm wide and 1-2 μm high. The landing stops 140a, 140b can be 0.5-2.0 μm high and 0.2-0.6 μm wide. The electrodes 130a, 130b can be 0.2-0.5 μm high. The step electrodes 131a, 131b can be 0.5-1.0 μm in height. The reflective layer 111 can be 500 angstroms or less in thickness.

As described herein, a compensatory layer formed over a recess filled with sacrificial material can be planarized to form a flat surface so that subsequently formed layers are flat over regions where the compensatory layer was formed. In some embodiments, a thicker layer of the sacrificial material may be formed, hardened and polished, such as with chemical mechanical polishing (CMP), instead of forming a compensatory layer. However, CMP may be prone to dishing. Some types of sacrificial material applications, such as spinning, can reduce the aspect ratio of dips or bumps in the sacrificial material when applied over a non-flat surface. However, remnants of the topography from the layer below the sacrificial material often times remains. The compensatory layer along with a reduction process, such as etching, can result in a flatter surface than is provided by other methods.

It is understood that the disclosed methods are compatible with other configurations of micro mirrors. Different material from described above can be used to form the different layers of the mirror plate, the hinge connection post, the hinge support post, the electrodes and the landing stops. The electrodes can include steps as shown in the figures, or an upper surface at a single height. The mirror plate can also have different shapes such as a hexagon, a diamond and an octagon.

The disclosed methods are not limited to formation of micro mirrors. For example, the described methods can be applied to other micro devices, such as devices that include cantilevers, bridges or other devices having suspended features or that are formed by depositing layers of material over a sacrificial layer or cavity. The techniques described herein therefore can be applied to any device that include flat layers over cavities.

What is claimed is:

1. A method for fabricating a micro structure, comprising:
   disposing a sacrificial material in a recess formed in a lower layer;
   forming a layer of compensatory material on the sacrificial material in the recess, wherein the compensatory material is higher than the upper surface of the lower layer;
   removing a first portion of the compensatory material using isotropic etching to form a substantially flat surface on the sacrificial material, wherein the substantially flat surface is substantially co-planar with the upper surface of the lower layer; and
   forming an upper layer on the lower layer and the substantially flat surface
   removing the sacrificial material and a second portion of the compensatory material on the sacrificial material to form a cavity under the upper layer.

2. A method for fabricating a micro structure, comprising:
   disposing a sacrificial material in a recess formed in a lower layer;
   forming a photo-resist layer on the sacrificial material in the recess and the lower layer;
   removing a first portion of the photo-resist layer on the lower layer and the sacrificial material to form a substantially flat surface on the sacrificial material, wherein the substantially flat surface is substantially co-planar with the upper surface of the lower layer; and
   forming an upper layer on the lower layer and the substantially flat surface.

3. The method of claim 2, wherein the step of removing comprises chemical mechanical polishing the photo-resist layer to remove the first portion of the photo-resist layer on the lower layer and the sacrificial material.

4. The method of claim 2, further comprising:
   removing the sacrificial material and a second portion of the photo-resist layer on the sacrificial material to form a cavity under the upper layer.

5. The method of claim 2, wherein the photo-resist layer and the sacrificial material have substantially the same material composition, and the sacrificial material and the photo-resist layer on the sacrificial material are disposed in a continuous step.

6. The method of claim 2, wherein the upper layer comprises a reflective surface.

7. The method of claim 2, wherein the upper layer has an upper surface that has height variation smaller than 0.1 microns.

8. The method of claim 7, wherein the upper layer has an upper surface that has height variation smaller than 0.05 microns.

9. A method for fabricating a mirror plate over a substrate, comprising:
   forming a hinge support post on the substrate;
   forming a hinge connection post on the hinge support post and a hinge layer connected to the hinge connection post simultaneously;
   forming a spacer layer on the hinge layer, wherein the spacer layer comprises a hole over the hinge connection post;
   disposing a first sacrificial material in the hole in the spacer layer;
   forming a layer of compensatory material on the first sacrificial material, wherein the compensatory material is higher than the upper surface of the spacer layer;
   removing a first portion of the compensatory material using isotropic etching to form a substantially flat surface on the sacrificial material, wherein the substantially flat surface is substantially co-planar with the upper surface of the spacer layer;
   forming a reflective layer over the hinge layer and the substantially flat surface; and
   selectively removing portions of the reflective layer and the hinge layer to form the mirror plate and a hinge component that is connected to the hinge connection post and the hinge layer, wherein the mirror plate is configured to tilt around the hinge component.

10. The method of claim 9, further comprising:
    removing the sacrificial material and a second portion of the compensatory material on the sacrificial material to form a cavity under the reflective layer.

11. The method of claim 9, further comprising:
    forming a middle layer on the spacer layer and the first sacrificial material; and
    selectively removing material from the middle layer to form the layer of the compensatory material above the sacrificial material.

12. The method of claim 9, wherein the isotropic etching comprises plasma etching.

13. The method of claim 9, wherein the compensatory material comprises photo resist, silicon, or silicon dioxide.

14. The method of claim 9, wherein the compensatory material has substantially the same composition as the sacrificial material.

15. The method of claim 9, wherein the step of forming a hinge connection post comprises:
    disposing a second sacrificial material on the substrate and the hinge support post;
    forming a via in the second sacrificial material to expose an upper surface of the hinge support post; and
    depositing an electrically conductive material to simultaneously form the hinge connection post in the via and the hinge layer on the sacrificial material.

16. The method of claim 9, wherein the hinge connection post comprises a bottom layer and a side layer that is conical or frustoconical, wherein the lower edge of the side layer is connected to the bottom layer to define a cavity.

17. The method of claim 9, wherein the hinge component and the hinge layer are co-planar.

18. The method of claim 9, wherein the hinge connection post, the hinge component and the hinge layer comprise an electrically conductive material.

19. A method for fabricating a mirror plate over a substrate, comprising:
    forming a hinge support post on the substrate;
    forming a hinge connection post on the hinge support post and a hinge layer connected to the hinge connection post;
    forming a spacer layer on the hinge layer, wherein the spacer layer comprises a hole over the hinge connection post;

disposing a first sacrificial material in the hole in the spacer layer;

forming a photo-resist layer on the first sacrificial material and the spacer layer;

removing a first portion of the photo-resist layer on the spacer layer and the sacrificial material to form a substantially flat surface on the sacrificial material, wherein the substantially flat surface has substantially the same height as the upper surface of the spacer layer;

forming a reflective layer over the hinge layer and the substantially flat surface; and selectively removing portions of the reflective layer and the hinge layer to form the mirror plate and a hinge component that is connected to the hinge connection post and the hinge layer, wherein the mirror plate is configured to tilt around the hinge component.

20. The method of claim 19, wherein the step of removing the first portion of the photo-resist layer on the spacer layer and the sacrificial material comprises chemical mechanical polishing the photo-resist layer to remove the first portion of the photo-resist layer on the spacer layer and the sacrificial material.

21. The method of claim 19, further comprising:

removing the sacrificial material and a second portion of the photo-resist layer on the sacrificial layer to form a cavity under the reflective layer.

* * * * *

UNITED STATES PATENT AND TRADEMARK OFFICE
CERTIFICATE OF CORRECTION

PATENT NO. : 7,884,021 B2  
APPLICATION NO. : 11/679767  
DATED : February 8, 2011  
INVENTOR(S) : Shaoher X. Pan et al.

Page 1 of 1

It is certified that error appears in the above-identified patent and that said Letters Patent is hereby corrected as shown below:

On the Title Page, (73) Assignee, please delete "Spartial" and insert --Spatial--

Column 9, claim 1, at line 26, after "layer" please delete "and"

Column 9, claim 1, at line 28, after "surface" please insert --; and--

Signed and Sealed this
Twenty-sixth Day of April, 2011

David J. Kappos
*Director of the United States Patent and Trademark Office*